United States Patent  [10] Patent No.: US 7,730,719 B2
Yoshida  (45) Date of Patent: Jun. 8, 2010

(54) EXHAUST PURIFICATION APPARATUS OF COMPRESSION IGNITION TYPE INTERNAL COMBUSTION ENGINE

(75) Inventor: Kohei Yoshida, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 666 days.

(21) Appl. No.: 11/596,987

(22) PCT Filed: Apr. 12, 2006

(86) PCT No.: PCT/JP2006/308164

§ 371 (c)(1),
(2), (4) Date: Nov. 20, 2006

(87) PCT Pub. No.: WO2006/109889

PCT Pub. Date: Oct. 19, 2006

(65) Prior Publication Data

US 2009/0071125 A1    Mar. 19, 2009

(30) Foreign Application Priority Data

Apr. 12, 2005   (JP)   ............................. 2005-114406

(51) Int. Cl.
*F01N 3/00*   (2006.01)
(52) U.S. Cl. .............................. 60/286; 60/295; 60/299; 60/300
(58) Field of Classification Search .................. 60/272, 60/276, 295, 277, 299
See application file for complete search history.

(56) References Cited

U.S. PATENT DOCUMENTS

| 6,318,073 | B1 * | 11/2001 | Boegner et al. | ................ 60/274 |
| 6,482,377 | B2 * | 11/2002 | Bartley et al. | ............. 423/213.2 |
| 6,679,050 | B1 * | 1/2004 | Takahashi et al. | .............. 60/285 |
| 6,988,360 | B2 * | 1/2006 | Kimura et al. | ................. 60/286 |
| 2001/0035006 | A1 * | 11/2001 | Dou et al. | ....................... 60/274 |
| 2003/0159435 | A1 * | 8/2003 | Berris et al. | ................... 60/295 |
| 2004/0020192 | A1 | 2/2004 | Kimura et al. | |

FOREIGN PATENT DOCUMENTS

| EP | 1030043 A2 * | 8/2000 |
| JP | A 06-066129 | 3/1994 |
| JP | A 2000-145436 | 5/2000 |
| JP | A 2000-291422 | 10/2000 |
| JP | A 2000-314309 | 11/2000 |
| JP | A 2004-060596 | 2/2004 |
| JP | A 2004-251142 | 9/2004 |

* cited by examiner

*Primary Examiner*—Thomas E Denion
*Assistant Examiner*—Jesse Bogue
(74) *Attorney, Agent, or Firm*—Oliff & Berridge, PLC

(57) ABSTRACT

In an internal combustion engine, an SOx trap catalyst (11) able to trap SOx contained in exhaust gas is arranged in an engine exhaust passage upstream of an NOx storing catalyst (12). When whether the SOx trap catalyst (11) has deteriorated should be judged, the SOx trap catalyst (11) is raised in temperature in the state with the air-fuel ratio of the exhaust gas flowing into the SOx trap catalyst (11) maintained lean. At this time, the concentration of NOx released from the SOx trap catalyst (11) is detected by the NOx concentration sensor (24). When the NOx concentration is a set value or less, the catalyst is judged to have deteriorated.

14 Claims, 20 Drawing Sheets

Fig. 3
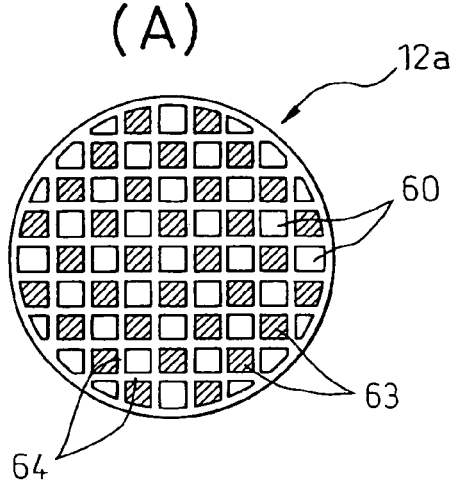
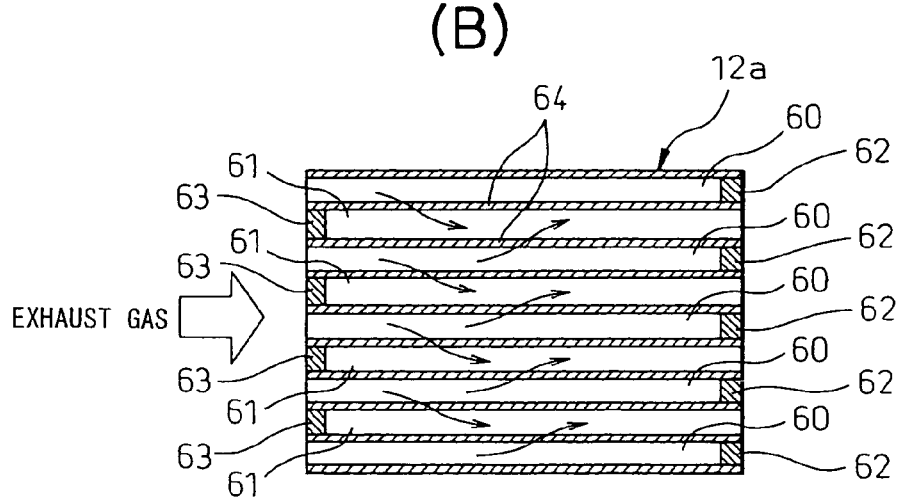
Fig. 4
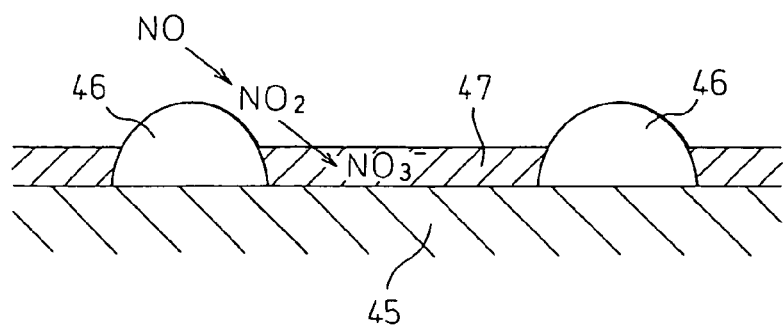

Fig.9
(A)
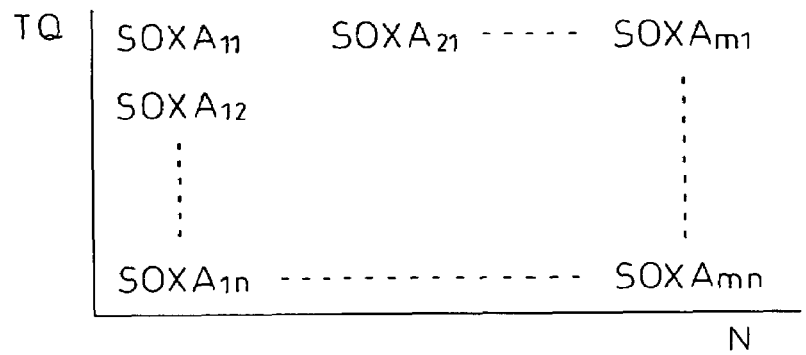
(B)
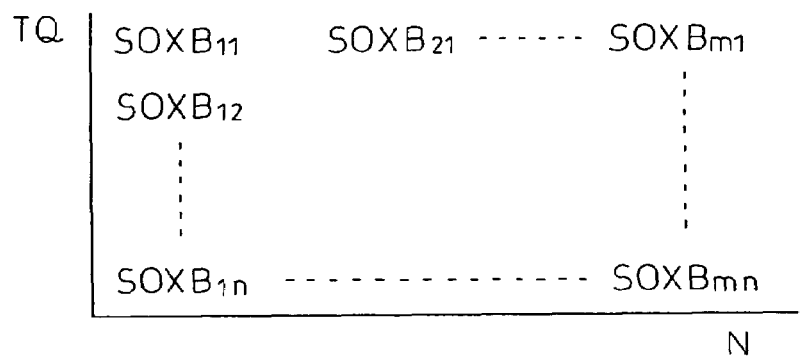
(C)
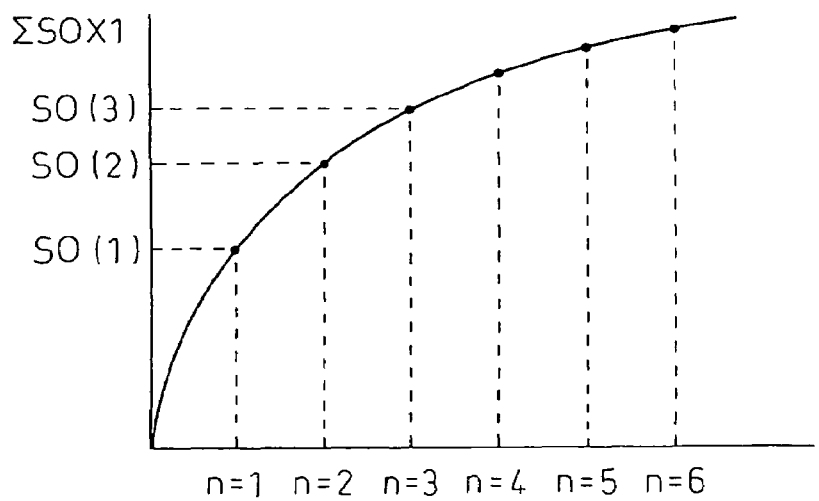

Fig.22
(A)
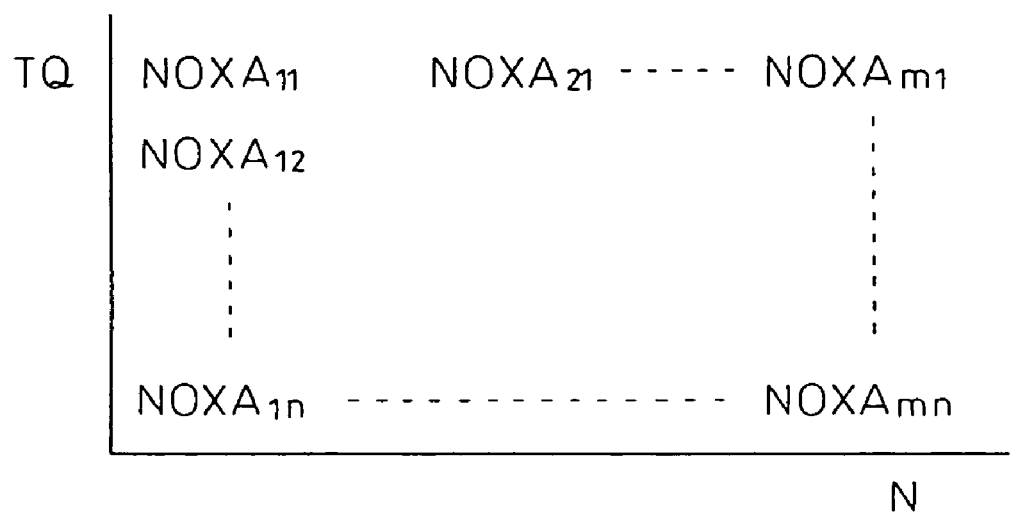
(B)
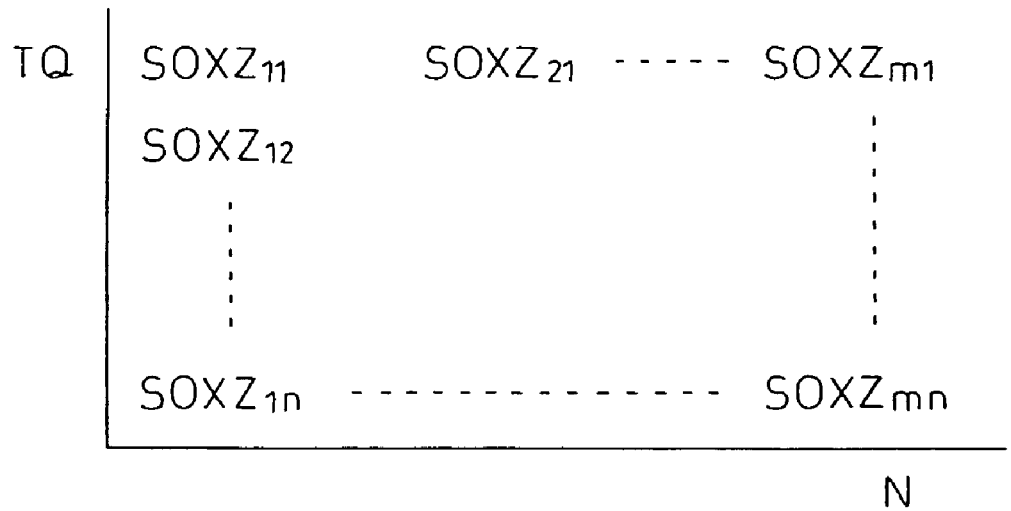

EXHAUST PURIFICATION APPARATUS OF COMPRESSION IGNITION TYPE INTERNAL COMBUSTION ENGINE

TECHNICAL FIELD

The present invention relates to an exhaust purification apparatus of a compression ignition type internal combustion engine.

BACKGROUND ART

An internal combustion engine providing in the engine exhaust passage an NOx storing catalyst storing NOx contained in exhaust gas when the air-fuel ratio of the inflowing exhaust gas is lean and releasing the stored NOx when the air-fuel ratio of the inflowing exhaust gas is the stoichiometric air-fuel ratio or rich is known. In this internal combustion engine, the NOx produced when burning fuel under a lean air-fuel ratio is stored in the NOx storing catalyst. On the other hand, when the NOx storage ability of the NOx storing catalyst becomes close to being saturated, the air-fuel ratio of the exhaust gas is temporarily made rich and thereby NOx is released from the NOx storing catalyst and reduced.

However, fuel and lubrication oil contain sulfur, therefore the exhaust gas contains SOx. This SOx is stored together with NOx in the NOx storing catalyst. However, this SOx is not released from the NOx storing catalyst by just making the air-fuel ratio of the exhaust gas rich. Therefore, the amount of SOx stored in the NOx storing catalyst gradually increases. As a result, the NOx amount which can be stored ends up gradually decreasing.

Therefore, an internal combustion engine providing an SOx absorbent in the engine exhaust passage upstream of the NOx storing catalyst for preventing SOx from being sent to the NOx storing catalyst is known (see Japanese Patent Publication (A) No. 2000-145436). In this internal combustion engine, the SOx included in the exhaust gas is absorbed in the SOx absorbent, therefore SOx can be prevented from flowing into the NOx storing catalyst. As a result, it is possible to prevent storage of SOx from causing a drop in the NOx storage ability.

However, when using this SOx absorbent, if the SOx absorption ability of the SOx absorbent ends up becoming saturated, the SOx ends up flowing into the NOx storing catalyst. However, with this SOx absorbent, if raising the temperature of the SOx absorbent and making the air-fuel ratio of the exhaust gas flowing into the SOx absorbent rich, the SOx absorbent can be made to release the absorbed SOx and therefore the SOx absorbent can be restored. However, if making the SOx absorbent release SOx in this way, the released SOx ends up being stored in the NOx storing catalyst. Therefore, this internal combustion engine is provided with a bypass passage for bypassing the NOx storing catalyst. When making the SOx absorbent release the SOx, the released SOx is made to be exhausted through the bypass passage into the atmosphere.

As explained above, with the above-mentioned SOx absorbent, it is possible to raise the temperature of the SOx absorbent and make the air-fuel ratio of the exhaust gas flowing into the SOx absorbent rich so as to make the NOx absorbent release the SOx. However, in this case, the SOx is released from the SOx absorbent only at bit at a time. Therefore, to make the SOx absorbent release all of the absorbed SOx, the air-fuel ratio has to be made rich for a long period of time. Therefore, there is the problem that a large amount of fuel or reducing agent becomes necessary. Further, the SOx released from the SOx absorbent is exhausted into the atmosphere, so this is also not preferable.

When using an SOx absorbent in this way, if an SOx release control is not performed, the SOx absorption ability ends up being limited. Therefore, when using an SOx absorbent, an SOx release control must be performed. However, so long as performing an SOx release control, that is, making the SOx absorbent release SOx, the above-mentioned problem arises.

DISCLOSURE OF THE INVENTION

The present invention provides an exhaust purification apparatus of a compression ignition type internal combustion engine able to maintain a sufficient SOx absorption ability and able to judge if an SOx trap catalyst has deteriorated without releasing SOx by use of an SOx trap catalyst able to be restored in SOx absorption ability without making the air-fuel ratio of the exhaust gas rich.

According to the present invention, there is provided a compression ignition type internal combustion engine providing inside the engine exhaust passage an SOx trap catalyst able to trap SOx contained in exhaust gas and providing in the exhaust passage downstream of the SOx trap catalyst an NOx storing catalyst storing NOx contained in the exhaust gas when the air-fuel ratio of the inflowing exhaust gas is lean and releasing the stored NOx when the air-fuel ratio of the exhaust gas becomes the stoichiometric air-fuel ratio or rich, wherein the SOx trap catalyst has the property of trapping the SOx contained in the exhaust gas when the air-fuel ratio of the exhaust gas flowing into the SOx trap catalyst is lean and allowing the trapped SOx to gradually diffuse inside the SOx trap catalyst when the air-fuel ratio of the exhaust gas is lean and the SOx trap catalyst rises in temperature and has the property of releasing the trapped SOx when the air-fuel ratio of the exhaust gas flowing into the SOx trap catalyst becomes rich and the temperature of the SOx trap catalyst is the SOx release temperature or more, provision is made of air-fuel ratio controlling means continuing to maintain the air-fuel ratio of the exhaust gas flowing into the SOx trap catalyst lean without making it rich during the engine operation and a deterioration judging means for judging if the SOx trap catalyst has deteriorated, the temperature of the SOx trap catalyst is raised in a state wherein the air-fuel ratio of the exhaust gas is lean when whether the SOx trap catalyst has deteriorated should be judged, and, at this time, the NOx amount released from the SOx trap catalyst is detected and this detected NOx amount is used to judge if the SOx trap catalyst has deteriorated.

BRIEF DESCRIPTION OF THE DRAWINGS

FIG. 3 is a view showing the structure of a particulate filter, FIG. 4 is a cross-sectional view of the surface part of a catalyst carrier of an NOx storing catalyst, FIG. 9 is a view showing the relationship between the stored SOx amount ΣSOX1 and the stored SOx amount SO(n) for a temperature elevation control, FIG. 22 is a view showing a map of the stored NOx amount NOXA etc.

BEST MODE FOR WORKING THE INVENTION

Figure 1:
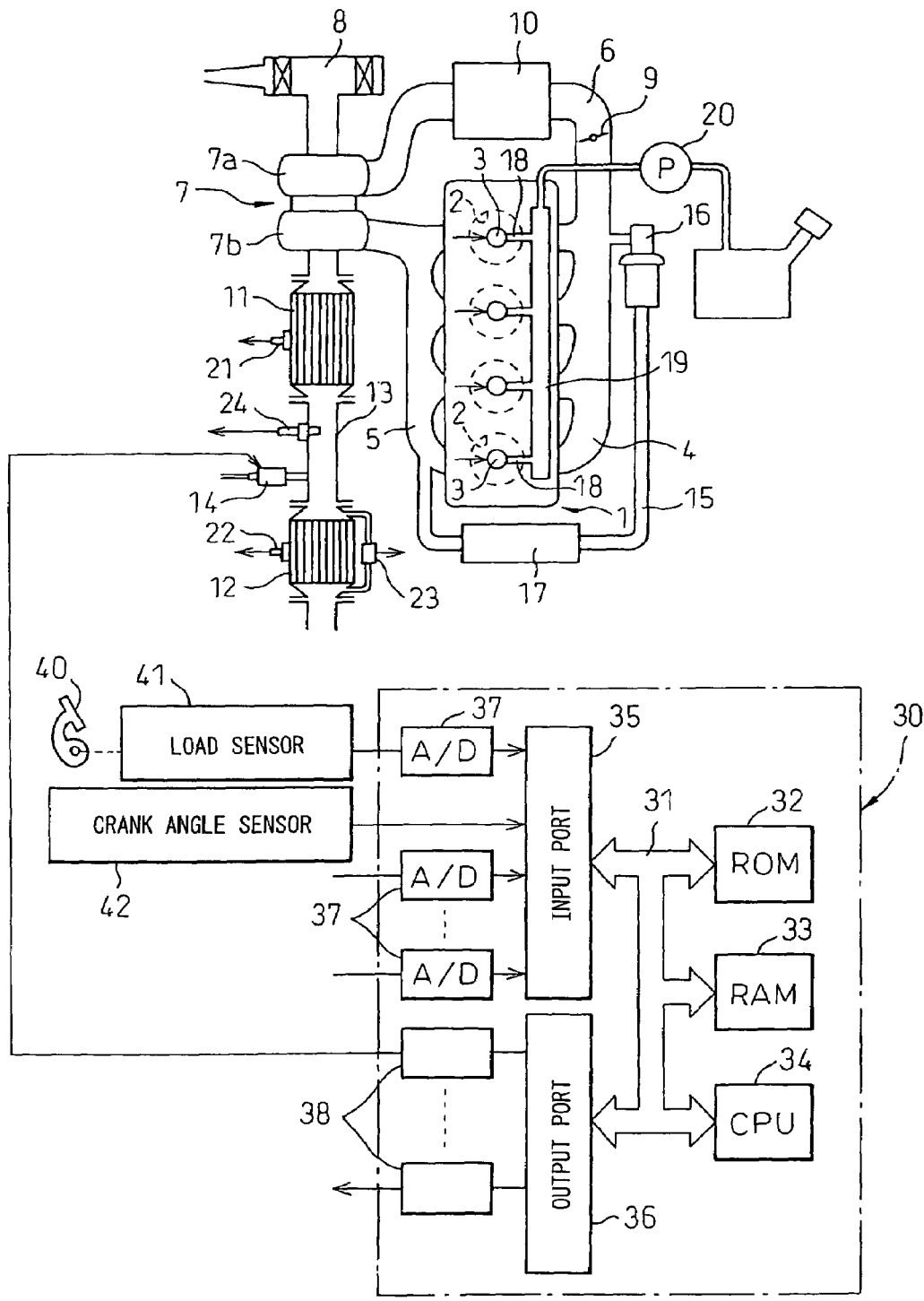
FIG. 1 is an overall view of a compression ignition type internal combustion engine.

FIG. 1 is an overall view of a compression ignition type internal combustion engine.

Referring to FIG. 1, 1 indicates an engine body, 2 indicates a combustion chamber of each cylinder, 3 indicates an electronic control fuel injector for injecting fuel into each combustion chamber 2, 4 indicates an intake manifold, and 5 indicates an exhaust manifold. The intake manifold 4 is connected through an intake duct 6 to an outlet of a compressor 7a of an exhaust turbocharger 7, while an inlet of the compressor 7a is connected to an air cleaner 8. The intake duct 6 is provided inside it with a throttle valve 9 driven by a step motor. Further, the intake duct 6 is provided around it with a cooling apparatus 10 for cooling the intake air flowing through the intake duct 6. In the embodiment shown in FIG. 1, the engine cooling water is led into the cooling apparatus 10. The engine cooling water cools the intake air. On the other hand, the exhaust manifold 5 is connected to an inlet of an exhaust turbine 7b of the exhaust turbocharger 7, while an outlet of the exhaust turbine 7b is connected to an inlet of a SOx trap catalyst 11. Further, the outlet of the SOx trap catalyst 11 is connected through an exhaust pipe 13 to an NOx storing catalyst 12. The exhaust pipe 13 is provided with a reducing agent feed valve 14 for supplying a reducing agent comprised of for example a hydrocarbon into the exhaust gas flowing through the exhaust pipe 13.

The exhaust manifold 5 and the intake manifold 4 are connected with each other through an exhaust gas recirculation (below, called an "EGR") passage 15. The EGR passage 15 is provided inside it with an electronic control type EGR control valve 16. Further, the EGR passage 15 is provided around it with a cooling apparatus 17 for cooling the EGR gas flowing through the EGR passage 15. In the embodiment shown in FIG. 1, engine cooling water is guided inside the cooling apparatus 17. The engine cooling water cools the EGR gas. On the other hand, each fuel injector 3 is connected through a fuel feed pipe 18 to a common rail 19. This common rail 19 is supplied with fuel from an electronic control type variable discharge fuel pump 20. The fuel supplied into the common rail 19 is supplied through the fuel feed pipes 18 to the fuel injectors 3.

The electronic control unit 30 is comprised of a digital computer provided with a ROM (read only memory) 32, RAM (random access memory) 33, CPU (microprocessor) 34, input port 35, and output port 36 connected with each other by a bidirectional bus 31. The SOx trap catalyst 11 has a temperature sensor 21 attached to it for detecting the temperature of the SOx trap catalyst 11, while the NOx storing catalyst 12 has a temperature sensor 22 attached to it for detecting the temperature of the NOx storing catalyst 12. The output signals of these temperature sensors 21 and 22 are input through the corresponding AD converters 37 to the input port 35. Further, the NOx storing catalyst 12 has a pressure difference sensor 23 attached to it for detecting the pressure difference before and after the NOx storing catalyst 12. The output signal of this pressure difference sensor 23 is input through the corresponding AD converter 37 to the input port 35. Further, the exhaust pipe 13 has an NOx concentration sensor 24 arranged in it for detecting the concentration of NOx in the exhaust gas flowing out from the SOx trap catalyst 11. The output signal of this NOx concentration sensor 24 is input through the corresponding AD converter 37 to the input port 35.

The accelerator pedal 40 has a load sensor 41 connected to it for generating an output pulse proportional to the amount of depression L of the accelerator pedal 40. The output voltage of the load sensor 41 is input through the corresponding AD converter 37 to the input port 35. Further, the input port 35 has a crank angle sensor 42 connected to it for generating an output pulse each time the crank shaft rotates by for example 15°. On the other hand, the output port 36 is connected through the corresponding drive circuits 38 to the fuel injectors 3, throttle valve 9 drive step motor, reducing agent feed valve 14, EGR control valve 16, and fuel pump 20.

Figure 2:
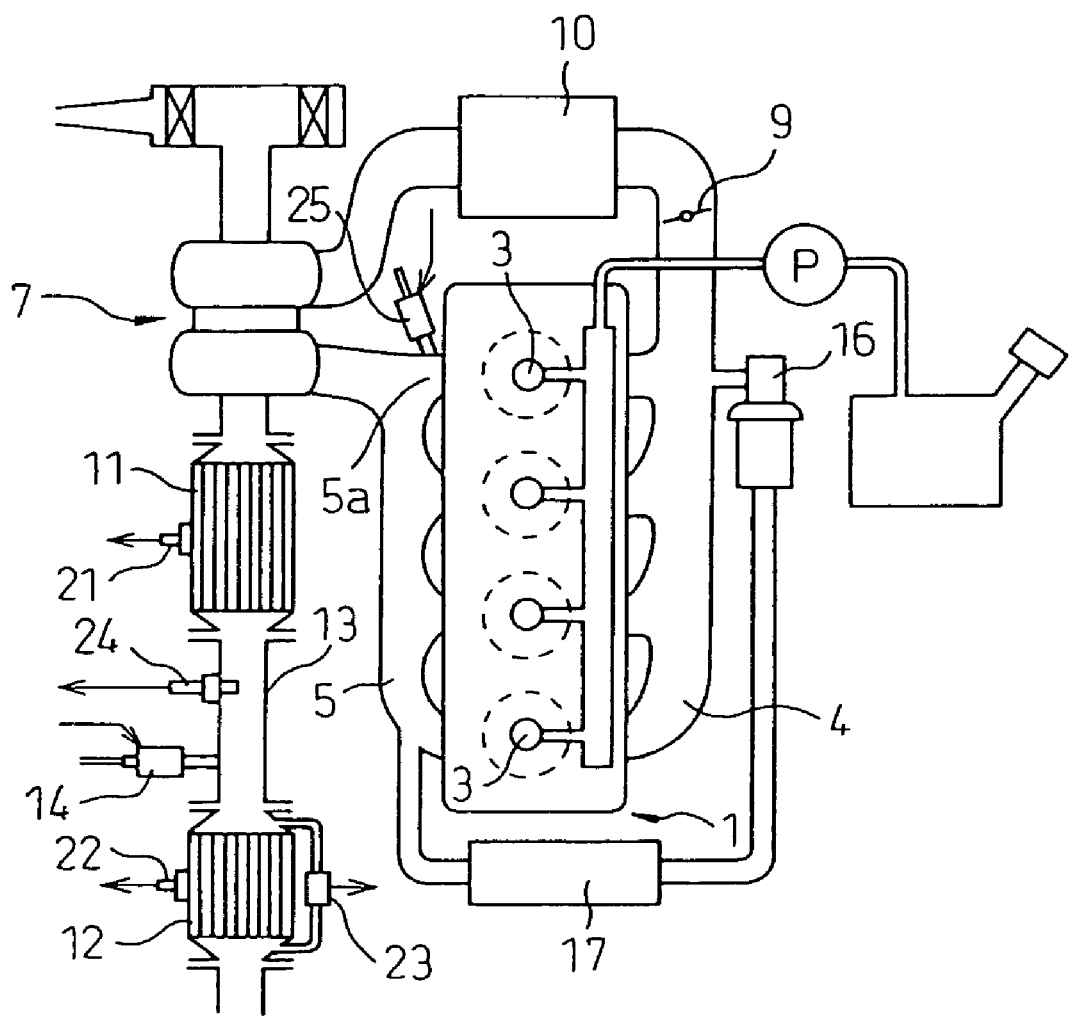
FIG. 2 is an overall view showing another embodiment of a compression ignition type internal combustion engine.

FIG. 2 shows another embodiment of a compression ignition type internal combustion engine. In this embodiment, in addition to a reducing agent feed valve 14 attached to the exhaust pipe 13, a manifold tube 5a of for example a No. 1 cylinder of the exhaust manifold 5 has a hydrocarbon feed valve 25 provided inside it for feeding a hydrocarbon.

First, explaining the NOx storing catalyst 12 shown in FIG. 1 and FIG. 2, the NOx storing catalyst 12 is carried on a three dimensional net structure monolith carrier or pellet shaped carrier or is carried on a particulate filter forming a honeycomb structure. In this way, the NOx storing catalyst 12 can be carried on various types of carriers, but below the case where the NOx storing catalyst 12 is carried on a particulate filter will be explained.

FIGS. 3(A) and (B) show the structure of a particulate filter 12a carrying an NOx storing catalyst 12. Note that FIG. 3(A) shows a front view of the particulate filter 12a, while FIG. 3(B) shows a cross-sectional view of a side surface of the particulate filter 12a. As shown in FIGS. 3(A) and (B), the particulate filter 12a forms a honeycomb structure and is provided with a plurality of exhaust passages 60 and 61 extending in parallel to each other. These exhaust passages are comprised of exhaust gas inflow passages 60 with downflow ends blocked by plugs 62 and exhaust gas outflow passages 61 with upstream ends blocked with plugs 63. Note that, in FIG. 3(A), the hatched parts indicate the plugs 63. Therefore, the exhaust gas inflow passages 60 and exhaust gas outflow passages 61 are arranged alternately through thin partition walls 64. In other words, the exhaust gas inflow passages 60 and exhaust gas outflow passages 61 are arranged so that each exhaust gas inflow passage 60 is surrounded by four exhaust gas outflow passages 61 and each exhaust gas outflow passage 61 is surrounded by four exhaust gas inflow passages 60.

The particulate filter 12a is formed from a porous material such as for example cordierite. Therefore, the exhaust gas flowing into the exhaust gas inflow passage 60, as shown by the arrows in FIG. 3(B), passes through the surrounding partition walls 64 and flows out into the adjoining exhaust gas outflow passages 61.

When carrying the NOx storing catalyst 12 on the particulate filter 12a in this way, the circumferential walls of the exhaust gas inflow passages 60 and exhaust gas outflow passages 61, that is, the two surfaces of the partition walls 64 and the inside walls of the pores in the partition walls 64, carry for example a catalyst carrier made of alumina. FIG. 4 illustrates a cross-section of the surface part of this catalyst carrier 45. As shown in FIG. 4, the catalyst carrier 45 carries on its surface a dispersed precious metal catalyst 46. Further, the catalyst carrier 45 is formed on its surface with a layer of an NOx absorbent 47.

In an embodiment according to the present invention, platinum Pt is used as the precious metal catalyst 46. As the ingredient forming the NOx absorbent 47, for example, at least one element selected from potassium K, sodium Na, cesium Cs, or another such alkali metal, barium Ba, calcium Ca, or another such alkali earth, lanthanum La, yttrium Y, or another such rare earth may be used.

If the ratio of the air and fuel (hydrocarbon) supplied to the engine intake passage, combustion chamber 2, and exhaust passage upstream of the NOx storing catalyst 12 is called the air-fuel ratio of the exhaust gas, the NOx absorbent 47 has an NOx absorption/release action of absorbing the NOx when the air-fuel ratio of the exhaust gas is lean and releasing the absorbed NOx when the concentration of oxygen in the exhaust gas falls.

That is, explaining as an example the case of using barium Ba as the ingredient forming the NOx absorbent 47, when the air-fuel ratio of the exhaust gas is lean, that is, when the concentration of hydrogen in the exhaust gas is high, the NO included in the exhaust gas, as shown in FIG. 4, is oxidized on the platinum Pt 46 to become $NO_2$, then is absorbed in the NOx absorbent 47 and bonds with the barium oxide BaO while being diffused in the NOx absorbent in the form of nitrate ions $NO_3^-$. In this way, the NOx is absorbed in the NOx absorbent 47. So long as the concentration of oxygen in the exhaust gas is high, $NO_2$ is formed on the surface of the platinum Pt 46. So long as the NOx absorption ability of the NOx absorbent 47 is not saturated, the $NO_2$ is absorbed in the NOx absorbent 47 and nitrate ions $NO_3^-$ are formed.

As opposed to this, if having the reducing agent feed valve 14 feed reducing agent to make the air-fuel ratio of the exhaust gas rich or the stoichiometric air-fuel ratio, the concentration of oxygen in the exhaust gas falls, so conversely the reaction proceeds in the opposite direction ($NO_3^- \rightarrow NO_2$), therefore nitrate ions $NO_3^-$ in the NOx absorbent 47 are released in the form of $NO_2$ from the NOx absorbent 47. Next, the released NOx is reduced by the unburnt HC and CO contained in the exhaust gas.

When the air-fuel ratio of the exhaust gas is lean in this way, that is, when burning the fuel under a lean air-fuel ratio, the NOx in the exhaust gas is absorbed in the NOx absorbent 47. However, when fuel continues to be burned under a lean air-fuel ratio, the NOx absorption ability of the NOx absorbent 47 ends up being saturated during that period. Therefore, the NOx absorbent 47 ends up no longer being able to absorb the NOx. Therefore, in an embodiment according to the present invention, before the absorption ability of the NOx absorbent 47 becomes saturated, the reducing agent feed valve 14 feeds a reducing agent to make the air-fuel ratio of the exhaust gas temporarily rich and thereby makes the NOx absorbent 47 release the NOx.

However, exhaust gas contains SOx, that is, $SO_2$. If this $SO_2$ flows into the NOx storing catalyst 12, this $SO_2$ is oxidized in the platinum Pt 46 and becomes $SO_3$. Next, this $SO_3$ is absorbed in the NOx absorbent 47 and bonds with the barium oxide BaO while diffusing in the NOx absorbent 47 in the form of sulfate ions $SO_4^{2-}$ to thereby produce a stable sulfate $BaSO_4$. However, the NOx absorbent 47 has a strong basicity, so this sulfate $BaSO_4$ stabilizes and becomes hard to decompose. By just making the air-fuel ratio of the exhaust gas rich, the sulfate $BaSO_4$ will not decompose and will remain as it is. Therefore, the NOx absorbent 47 increases in the amount of sulfate $BaSO_4$ along with the elapse of time. Therefore, along with the elapse of time, the amount of NOx which can be absorbed by the NOx absorbent 47 falls.

However, in this case, as explained at the start, if raising the temperature of the NOx storing catalyst 12 to the SOx release temperature of 600° C. or more and in that state making the air-fuel ratio of the exhaust gas flowing into the NOx storing catalyst 12 rich, the NOx absorbent 47 will release the SOx. However, in this case, the NOx absorbent 47 will only release the SOx a little at a time. Therefore, in order to make the NOx absorbent 47 release all of the absorbed SOx, it is necessary to make the air-fuel ratio rich over a long period of time. Therefore, there is the problem that a large amount of fuel or reducing agent becomes necessary. Further, the SOx released from the SOx absorbent 47 is exhausted into the atmosphere, so this is also not preferable.

Therefore, in the present invention, an SOx trap catalyst 11 is arranged upstream of the NOx storing catalyst 12 and this SOx trap catalyst 11 is used to trap the SOx contained in the exhaust gas and thereby prevent the SOx from flowing into the NOx storing catalyst 12. Next, this SOx trap catalyst 11 will be explained.

Figure 5:
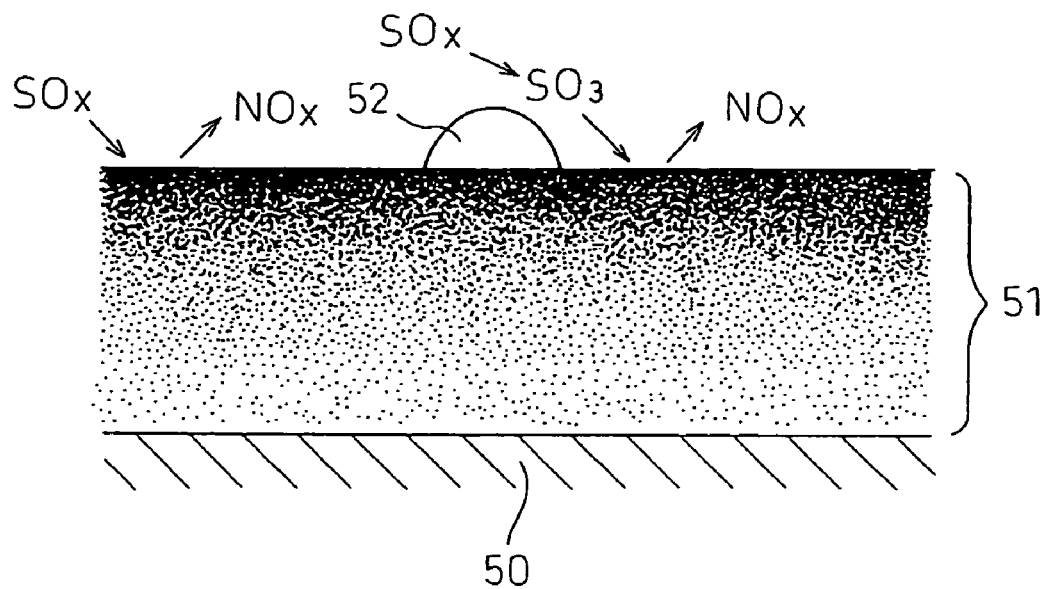
FIG. 5 is a cross-sectional view of the surface part of a catalyst carrier of an SOx trap catalyst.

This SOx trap catalyst 11 is for example comprised of a honeycomb structure monolith catalyst and has a large number of exhaust gas circulation holes extending straight in the axial line direction of the SOx trap catalyst 11. In forming the SOx trap catalyst 11 from a honeycomb structure monolith catalyst in this way, the inside walls of the exhaust gas circulation holes carry a catalyst carrier made from for example alumina. FIG. 5 illustrates a cross-section of the surface part of this catalyst carrier 50. As shown in FIG. 5, the catalyst carrier 50 is formed on its surface with a coat layer 51. This coat layer 51 carries on its surface a dispersed precious metal catalyst 52.

In an embodiment according to the present invention, platinum is used as the precious metal catalyst 52. As the ingredient forming the coat layer 51, for example, one of more elements selected from potassium K, sodium Na, cesium Cs, and other such alkali metals, barium Ba, calcium Ca, and other such alkali earths, lanthanum La, yttrium Y, and other rare earths is used. That is, the coat layer 51 of the SOx trap catalyst 11 exhibits a strong basicity.

Now then, exhaust gas contains a far larger amount of NOx compared with SOx. Therefore, when an engine is first operated, the coat layer 51 is filled with the trapped NOx. The trapped NOx forms nitrate ions $NO_3^-$. When the coat layer 51 is comprised of barium Ba, the trapped NOx bonds with the barium Ba and ions and forms barium nitrate $Ba(NO_3)_2$. On the other hand, the SOx contained in the exhaust gas, that is, the $SO_2$, is oxidized on the platinum Pt 52 as shown in FIG. 5, then is trapped in the coat layer 51. That is, the $SO_2$ diffuses in the coat layer 51 in the form of sulfate ions $SO_4^{2-}$ and disassociates the $NO_3^-$ from the barium Ba to form the sulfate $BaSO_4$. The $NO_3^-$ disassociated at this time is released to the outside from the coat layer 51. Note that, as explained above, the coat layer 51 exhibits a strong basicity, therefore, as shown in FIG. 5, part of the $SO_2$ contained in the exhaust gas is directly trapped in the coat layer 51 to form the sulfate $BaSO_4$.

In FIG. 5, the shading in the coat layer 51 shows the concentration of the trapped SOx. As will be understood from FIG. 5, the concentration of SOx in the coat layer 51 is highest in the vicinity of the surface of the coat layer 51 and gradually becomes lower the further inside. When the concentration of SOx at the vicinity of the surface of the coat layer 51 rises, the basicity of the surface of the coat layer 51 becomes weaker and the SOx trapping ability becomes weaker. Here, if calling the ratio of the SOx trapped in the SOx trap catalyst 11 and the SOx contained in the exhaust gas the SOx trap rate, if the basicity of the surface of the coat layer 51 becomes weaker, the SOx trap rate drops along with this.

Figure 6:
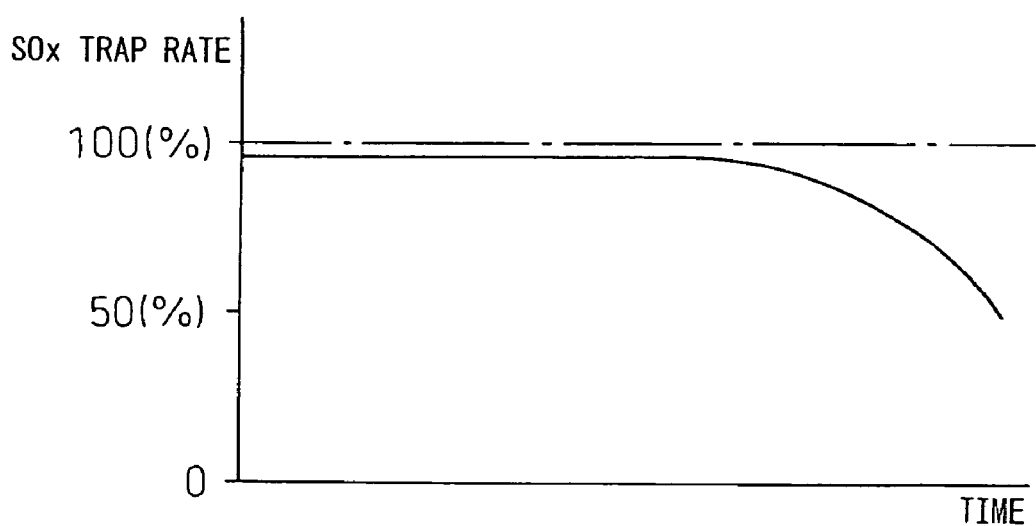
FIG. 6 is a view showing a SOx trap rate.
Figure 7:
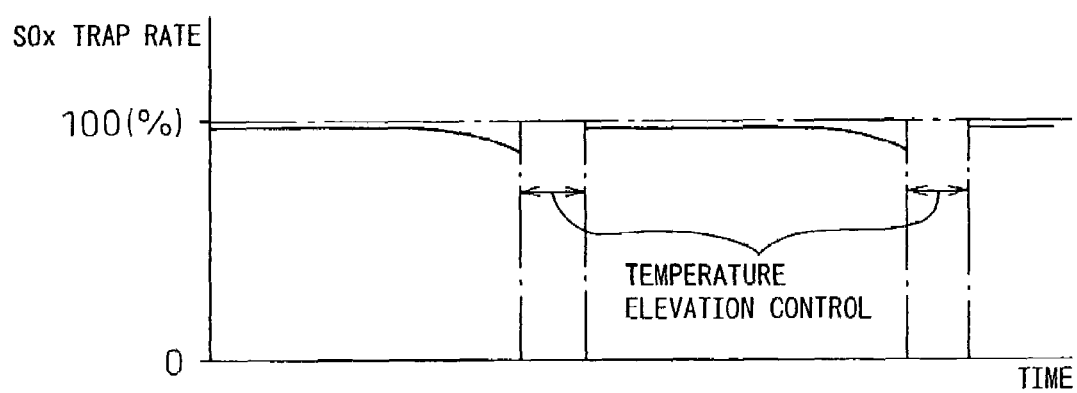
FIG. 7 is a view for explaining a temperature elevation control.

FIG. 6 shows the changes in the SOx trap rate along with time. As shown in FIG. 6, the SOx trap rate is first close to 100 percent, but then along with the elapse of time, the SOx trap rate rapidly drops. Therefore, in the present invention, as shown in FIG. 7, when the SOx trap rate has fallen below a predetermined rate, a temperature elevation control for raising the temperature of the SOx trap catalyst 11 under a lean air-fuel ratio of the exhaust gas is carried out, whereby the SOx trap rate is restored.

That is, if raising the temperature of the SOx trap catalyst 11 under a lean air-fuel ratio of the exhaust gas, the SOx concentrated at the vicinity of the surface in the coat layer 51 diffuses toward the inside of the coat layer 51 so that the concentration of SOx in the coat layer 51 becomes uniform. That is, the nitrates formed in the coat layer 51 change from an unstable state concentrated at the vicinity of the surface of the coat layer 51 to a stable state uniformly dispersed over the entire coat layer 51. When the SOx present at the vicinity of the surface in the coat layer 51 disperses toward the inside of the coat layer 51, the concentration of the SOx at the vicinity of the surface of the coat layer 51 falls, therefore when the temperature elevation control of the SOx trap catalyst 11 is completed, the SOx trap rate is restored as shown in FIG. 7.

When the temperature elevation control of the SOx trap catalyst 11 is performed, if making the temperature of the SOx trap catalyst 11 about 450° C., the SOx present at the vicinity of the surface of the coat layer 51 can be dispersed inside the coat layer 51. If raising the temperature of the SOx trap catalyst 11 to 600° C. or so, the SOx concentration in the coat layer 51 can be made considerably uniform. Therefore, at the time of a temperature elevation control of the SOx trap catalyst 11, the temperature of the SOx trap catalyst 11 is preferably raised to about 600° C. under a lean air-fuel ratio of the exhaust gas.

Note that when raising the temperature of the SOx trap catalyst 11 in this way, if making the air-fuel ratio of the exhaust gas rich, the SOx trap catalyst 11 ends up releasing SOx. Therefore, when raising the temperature of the SOx trap catalyst 11, the air-fuel ratio of the exhaust gas should be made rich. Further, if the concentration of SOx in the vicinity of the surface of the coat layer 51 rises, even if the SOx trap catalyst 11 is raised in temperature, if making the air-fuel ratio of the exhaust gas rich, the SOx trap catalyst 11 ends up releasing SOx. Therefore in the present invention, when the temperature of the SOx trap catalyst 11 is the SOx release temperature or more, the air-fuel ratio of the exhaust gas flowing into SOx trap catalyst 11 is made rich.

In the present invention, basically it is considered that the SOx trap catalyst 11 will be used as it is without replacement from the purchase of the vehicle to the end of its life. In recent years, in particular, the amount of sulfur contained in fuel has been reduced. Therefore, if making the size of the SOx trap catalyst 11 large to a certain extent, the SOx trap catalyst 11 can be used as it is without replacement until the end of life of the vehicle. For example, if the durability of a vehicle is a running distance of 500,000 km, the size of the SOx trap catalyst 11 should be made a size enabling the SOx to continue to be trapped by a high SOx trap rate without a temperature elevation control routine until a running distance of 250,000 km or so. In this case, the first temperature elevation control is performed at a running distance of about 250,000 km.

Next, the method of raising the temperature of the SOx trap catalyst 11 will be explained with reference to FIG. 8.

One effective method for raising the temperature of the SOx trap catalyst 11 is to delay the fuel injection timing to after top dead center of compression. That is, normally the main fuel $Q_m$ is injected near top dead center of compression as shown by (I) in FIG. 8. In this case, as shown in (II) of FIG. 8, if the injection timing of the main fuel $Q_m$ is delayed, the post-combustion period will become longer, therefore the exhaust gas temperature will rise. Along with the rise of the exhaust gas temperature, the temperature of the SOx trap catalyst 11 rises.

Figure 8:
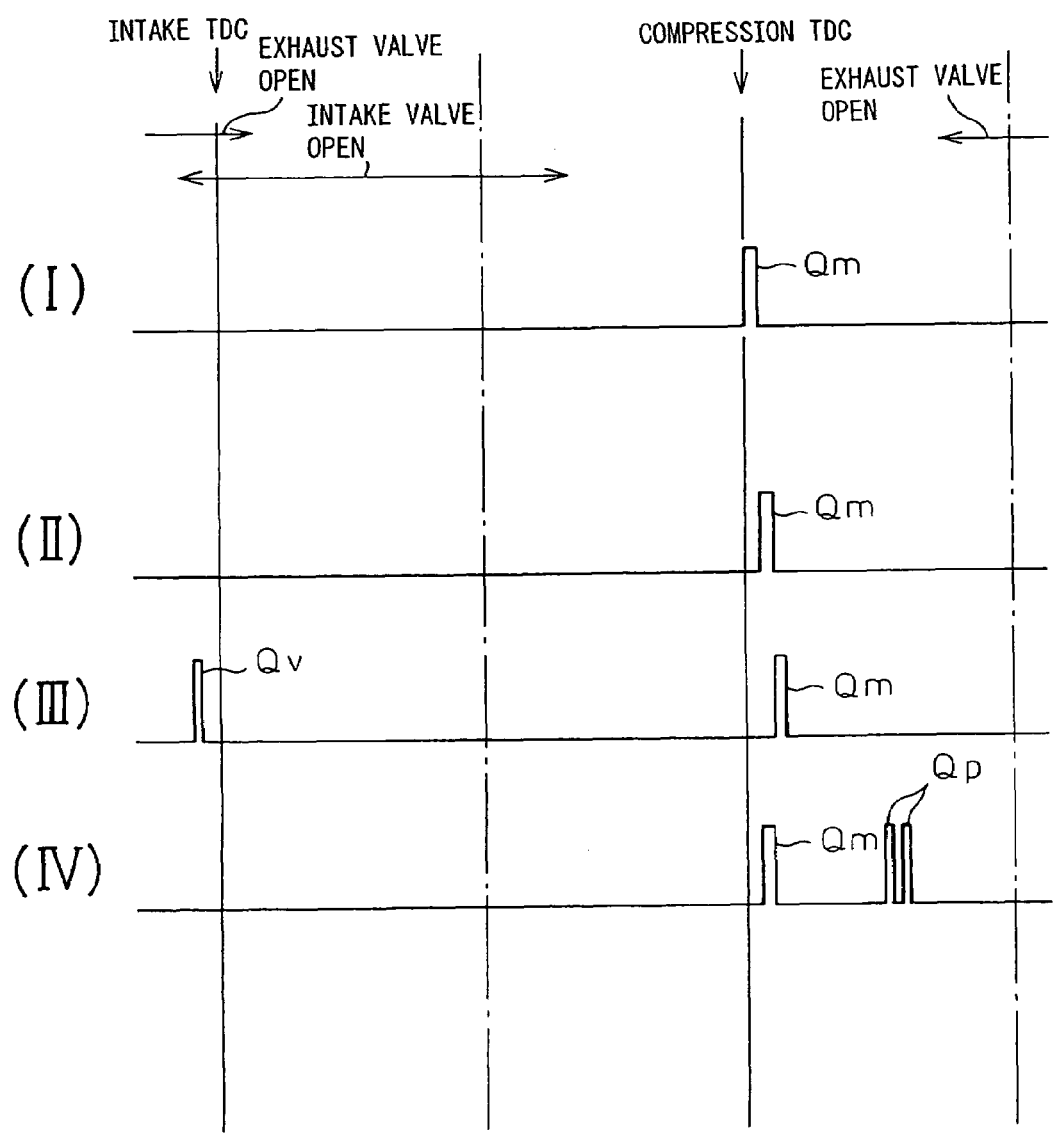
FIG. 8 is a view showing the injection timing.

Further, to raise the temperature of the SOx trap catalyst 11, as shown in (III) of FIG. 8, it is also possible to inject auxiliary fuel $Q_v$ near intake top dead center in addition to the main fuel $Q_m$. If additionally injecting auxiliary fuel $Q_v$ in this way, the fuel able to be burned increases by exactly the amount of the auxiliary fuel $Q_v$, so the exhaust gas temperature rises and therefore the temperature of the SOx trap catalyst 11.

On the other hand, if injecting the auxiliary fuel $Q_v$ near intake top dead center in this way, during the compression stroke, the heat of compression produces aldehydes, ketones, peroxides, carbon monoxide, and other intermediate products from this auxiliary fuel $Q_v$. These intermediate products accelerate the reaction of the main fuel $Q_m$. Therefore, in this case, even if greatly delaying the injection timing of the main fuel $Q_m$ as shown in (III) of FIG. 8, good combustion without misfires can be obtained. That is, since it is possible to greatly delay the injection timing of the main fuel $Q_m$ in this way, the exhaust gas temperature considerably rises. Therefore, the temperature of the SOx trap catalyst 11 can be quickly raised.

Further, to raise the temperature of the SOx trap catalyst 11, as shown in (IV) of FIG. 8, it is also possible to inject, in addition to the main fuel $Q_m$, auxiliary fuel $Q_p$ in the expansion stroke or in the exhaust stroke. That is, in this case, the majority of the auxiliary fuel $Q_p$ is exhausted to the exhaust passage in the form of unburnt hydrocarbons without being burned. The unburnt hydrocarbons are oxidized by excess oxygen in the SOx trap catalyst 11. The heat of the oxidation reaction generated at this time is raised in the temperature of the SOx trap catalyst 11.

On the other hand, in the internal combustion engine shown in FIG. 2, the hydrocarbon feed valve 25 may feed hydrocarbons and the heat of the oxidation reaction of the hydrocarbons may raise the temperature of the SOx trap catalyst 11. Further, it is also possible to perform any one of the injection control shown from (II) to (IV) of FIG. 8 while having the hydrocarbon feed valve 25 feed the hydrocarbons. Note that, no matter which method is used to raise the temperature, the air-fuel ratio of the exhaust gas flowing into SOx trap catalyst 11 is maintained lean without being made rich.

Next, referring to FIG. 9 to FIG. 12, an embodiment of SOx stabilization processing in the SOx trap catalyst 11 will be explained.

In this embodiment, the SOx amount trapped in the SOx trap catalyst 11 is estimated. When the SOx amount trapped in the SOx trap catalyst 11 exceeds a predetermined amount, it is judged if the SOx trap rate has fallen from a predetermined rate. At this time, to restore the SOx trap rate, a temperature elevation control for raising the temperature of the SOx trap catalyst 11 under a lean air-fuel ratio of the exhaust gas is performed.

That is, fuel contains a certain percentage of sulfur, therefore the amount of SOx contained in the exhaust gas, that is, the amount of SOx trapped in the SOx trap catalyst 11, is proportional to the amount of fuel injection. The amount of fuel injection is a function of the required torque and engine rotational speed. Therefore, the amount of SOx trapped in the SOx trap catalyst 11 also becomes a function of the required torque and engine rotational speed. In an embodiment according to the present invention, the SOx amount SOXA trapped in the SOx trap catalyst 11 per unit time is stored in advance as a function of the required torque TQ and engine rotational speed N in the ROM 32 in the form of a map as shown in FIG. 9(A).

Further, the lubrication oil also contains a certain percentage of sulfur, so the amount of lubrication oil burned in the combustion chamber 2, that is, the amount of SOx contained in the exhaust gas and trapped in the SOx trap catalyst 11, also becomes a function of the required torque and engine rotational speed. In an embodiment according to the present invention, the SOx amount SOXB contained in the lubrication oil and trapped by the SOx trap catalyst 11 per unit time is stored as a function of the required torque TQ and engine rotational speed N in the form of a map as shown in FIG. 9(B) in advance in the ROM 32. By cumulatively adding the SOx amount SOXA and the SOx amount SOXB, the SOx amount $\Sigma$SOX1 trapped in the SOx trap catalyst 11 is calculated.

Further, in an embodiment according to the present invention, as shown in FIG. 9(C), the relationship between the SOx amount $\Sigma$SOX1 and the predetermined SOx amount SO(n) when the SOx trap catalyst 11 should be raised in temperature is stored in advance. When the SOx amount $\Sigma$SOX1 exceeds a predetermined SO(n) (n=1, 2, 3, . . . ), processing is performed to raise the temperature of the SOx trap catalyst 11. Note that in FIG. 9(C), n shows the number of times of temperature elevation processing. As will be understood from FIG. 9(C), as the number of times n of temperature elevation for restoring the SOx trap rate increases, the predetermined amount SO(n) is increased. The rate of increase of this predetermined amount SO(n) becomes smaller the larger the number of times n of processing. That is, the rate of increase of SO(3) with respect to SO(2) is reduced from the rate of increase of the SO(2) with respect to SO(1).

Figure 10:
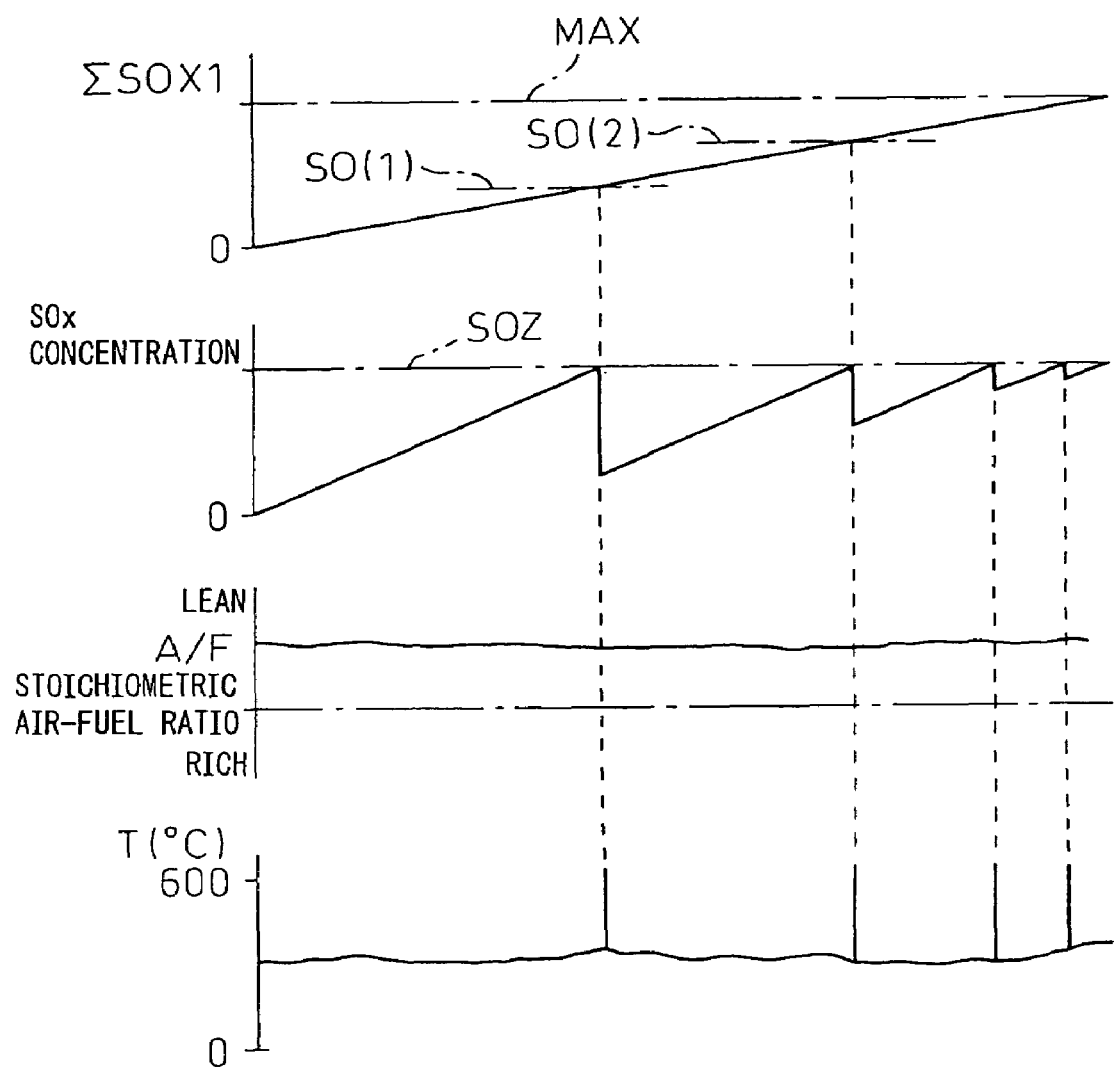
FIG. 10 is a time chart showing the change in the stored SOx amount ΣSOX1 etc.

That is, as shown by the time chart of FIG. 10, the SOx amount $\Sigma$SOX1 trapped in the SOx trap catalyst 11 continues to increase along with the elapse of time until reaching the allowable value MAX. Note that, in FIG. 10, $\Sigma$SOX1=MAX when the running distance reaches 500,000 km or so.

On the other hand, in FIG. 10, the SOx concentration shows the SOx concentration in the vicinity of the surface of the SOx trap catalyst 11. As will be understood from FIG. 10, when the SOx concentration in the vicinity of the surface of the SOx trap catalyst 11 exceeds the allowable value SOZ, the temperature T of the temperature of the SOx trap catalyst 11 is raised under a lean air-fuel ratio of the exhaust gas A/F in a temperature elevation control. When the temperature elevation control is performed, the SOx concentration in the vicinity of the surface of the SOx trap catalyst 11 decreases. The amount of decrease of this SOx concentration becomes smaller each time the temperature elevation control is performed. Therefore, the period from which a temperature elevation control is performed to when the next temperature elevation control is performed becomes shorter each time a temperature elevation control is performed.

Note that, as shown in FIG. 10, the fact that the trapped SOx amount $\Sigma$SOX1 reaches the SO(1), SO(2), . . . means that the SOx concentration in the vicinity of the surface of the SOx trap catalyst 11 has reached the allowable value SOZ.

Figure 11:
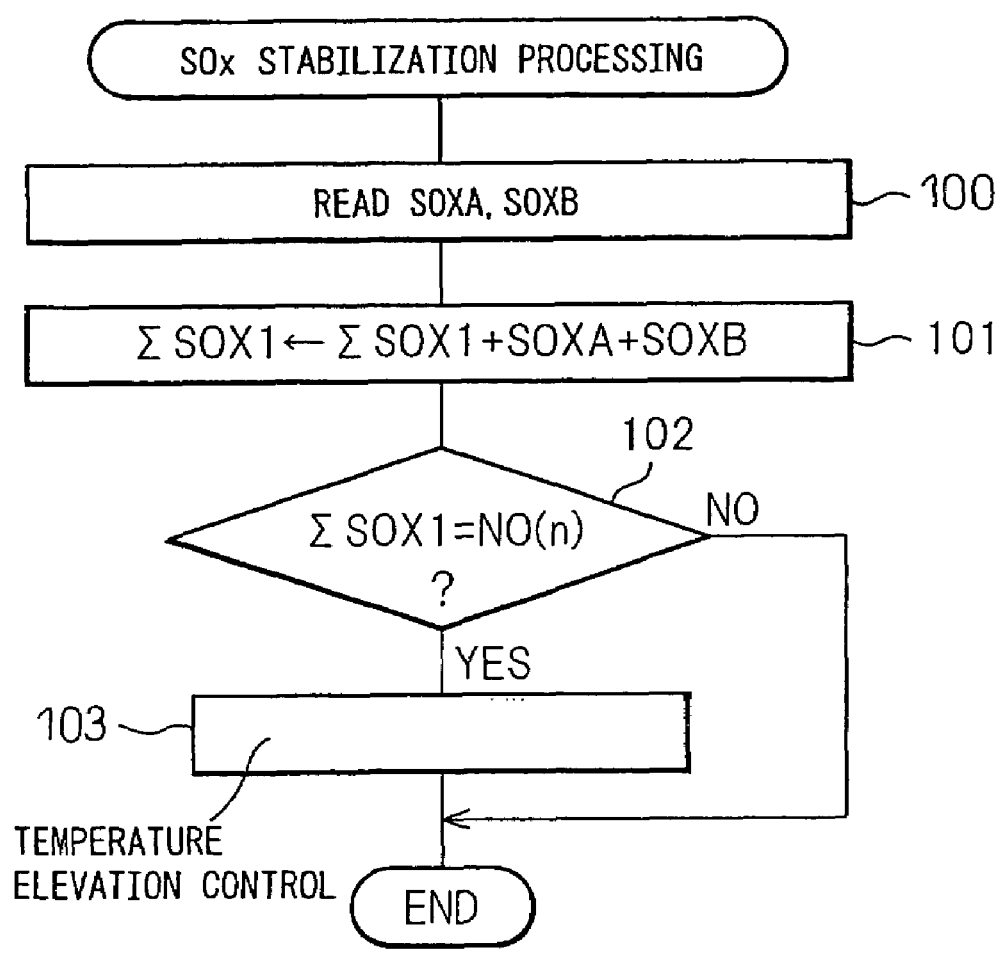
FIG. 11 is a flowchart for execution of an embodiment of SOx stabilization processing.

FIG. 11 shows the routine for execution of SOx stabilization processing.

Figure 12:
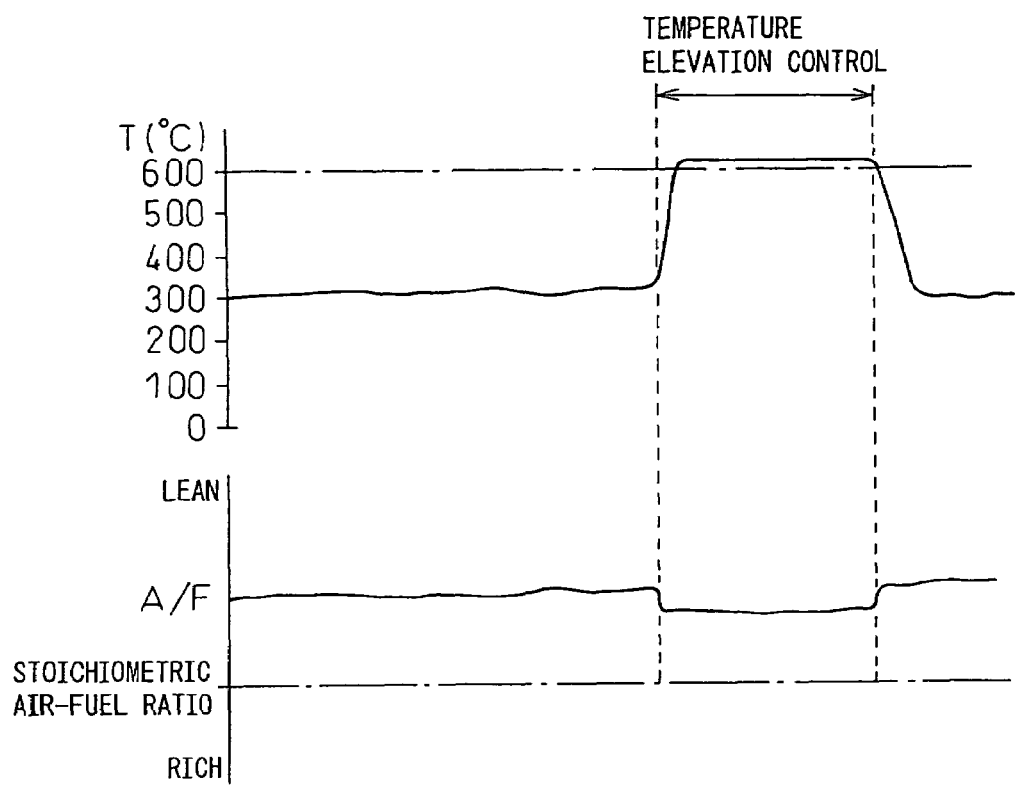
FIG. 12 is a time chart showing SOx stabilization processing.

Referring to FIG. 11, first, at step 100, the SOx amounts SOXA and SOXB trapped per unit time are read from FIGS. 9(A), (B). Next, at step 101, the sum of these SOXA and SOXB is added to the SOx amount $\Sigma$SOX1. Next, at step 102, it is judged if the SOx amount $\Sigma$SOX1 has reached a predetermined amount SO(n) (n=1, 2, 3, . . . ) shown in FIG. 9(C). When the SOx amount $\Sigma$SOX1 has reached a predetermined amount SO(n), the routine proceeds to step 103 where a temperature elevation control such as shown in FIG. 12 is performed.

Further, as explained above, in recent years, the amount of sulfur contained in fuel has been reduced, but some fuel contains a large amount of sulfur. If using fuel containing a large amount of sulfur in this way, the NOx trap rate ends up dropping early. That is, the SOx trap catalyst 11 ends up deteriorating early. Further, if operated at a low load over a long period of time, the SOx trap catalyst 11 is maintained at a low temperature. However, when the temperature of the SOx trap catalyst 11 is low, the SOx trapped at the vicinity of the surface of the coat layer 51 cannot diffuse inside the coat layer 51 and, as a result, the SOx trap rate falls, so in this case as well, the SOx trap catalyst 11 deteriorates early.

If the SOx trap catalyst 11 deteriorates, a large amount of SOx flows into the NOx storing catalyst 12 and, as a result, the NOx absorbent 47 becomes poisoned by SOx. Therefore, when the SOx trap catalyst 11 has deteriorated, the SOx trap catalyst 11 has to be replaced with a new SOx trap catalyst 11 or some other measure must be taken. For this reason, deterioration judging means for judging if the SOx trap catalyst 11 has deteriorated or not becomes necessary.

Figure 13:
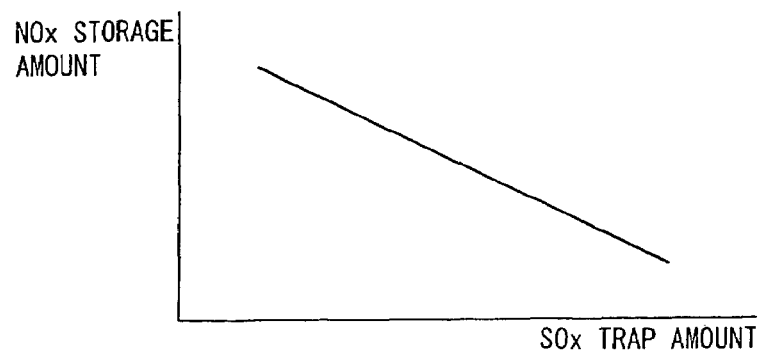
FIG. 13 is a view showing the relationship of the SOx trap rate and the NOx storage amount.

However, as explained above, when the SOx in the exhaust gas is trapped in the coat layer 51, the coat layer 51 releases $NO_3^-$ disassociated from the barium Ba in the form of $NO_2$ to the outside. Therefore, as shown in FIG. 13, the greater the amount of SOx trapped in the coat layer 51, that is, the SOx trap amount, the less the NOx amount stored in the coat layer 51. That is, if the SOx trap amount increases, in other words, if the SOx trap catalyst 11 deteriorates, the NOx storage amount decreases. Therefore, if the NOx storage amount can be detected, it is judged if the SOx trap catalyst 11 has deteriorated.

However, the NOx stored in the SOx trap catalyst 11 is released from the SOx trap catalyst 11 when the temperature of the SOx trap catalyst 11 rises even when not making the exhaust gas flowing into the SOx trap catalyst 11 rich, that is, when the air-fuel ratio of the exhaust gas is lean. Explaining this more specifically, if the temperature of the SOx trap catalyst 11 rises from 400° C. to 450° C. or so, the coat layer 51 starts to release the stored NOx. While the temperature of the SOx trap catalyst 11 rises to around 600° C., it releases almost all of the stored NOx.

Therefore, in the present invention, when it should be judged if the SOx trap catalyst 11 has deteriorated or not, the temperature of the SOx trap catalyst 11 is raised under a lean air-fuel ratio of the exhaust gas. As this time, the NOx amount released from the SOx trap catalyst 11 is detected and this detected NOx amount is used to judge if the SOx trap catalyst 11 has deteriorated.

Figure 14:
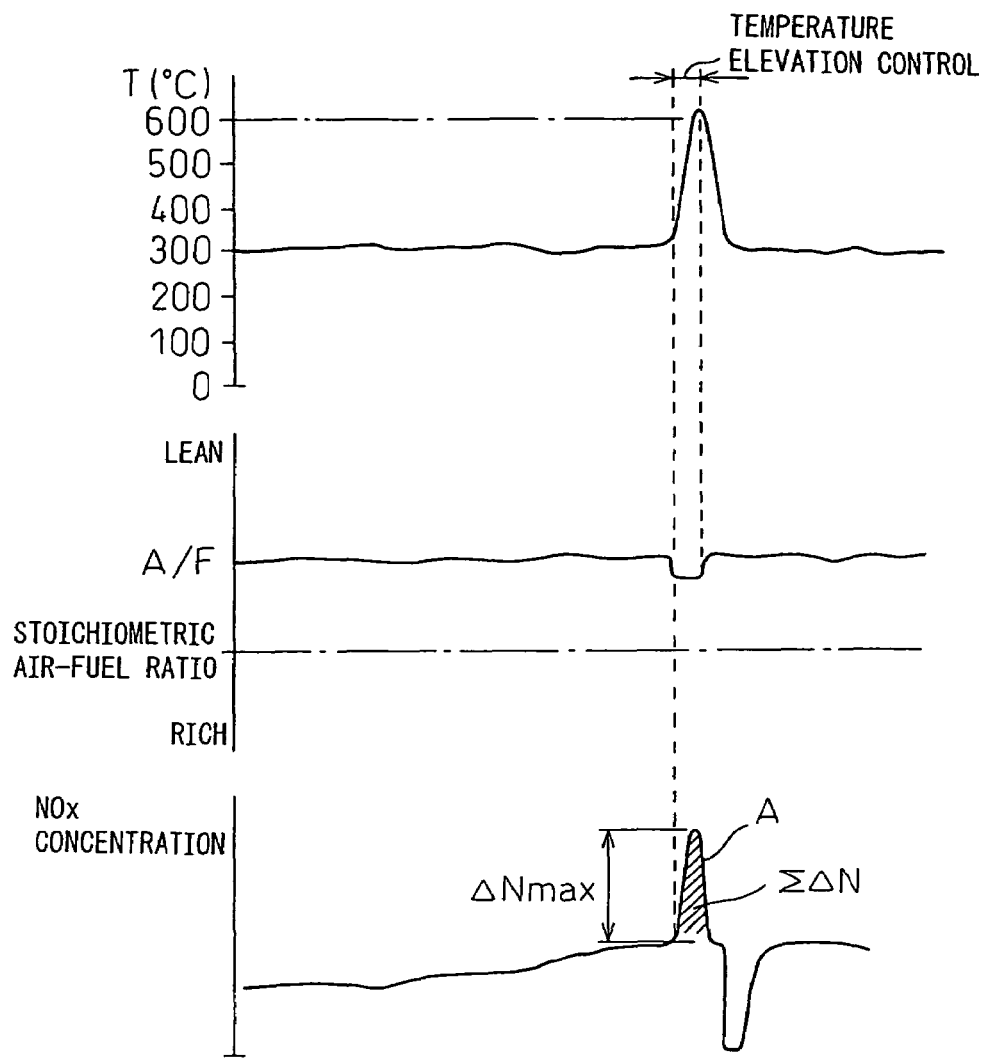
FIG. 14 is a time chart for explaining the deterioration judgment method.

That is, when it should be judged if the SOx trap catalyst 11 has deteriorated, as shown in FIG. 14, any of the injection control routines shown in (II) to (IV) of FIG. 8 is performed or the hydrocarbon feed valve 25 feeds hydrocarbon, and thereby the temperature elevation control for raising temporarily the temperature of the SOx trap catalyst 11 to about 500° C. or more under a lean air-fuel ratio of the exhaust gas is performed. If such temperature elevation control is performed, almost all of the NOx trapped in the coat layer 51 is released while the temperature of the SOx trap catalyst 11 is rising. Therefore, as shown in FIG. 14, the concentration of the NOx in the exhaust gas flowing out from the SOx trap catalyst 11 becomes higher when the temperature elevation control is performed.

This temperature elevation control is designed only to make the SOx trap catalyst 11 release the NOx, so differs from the temperature elevation control for SOx stabilization shown in FIG. 12. If the temperature of the SOx trap catalyst 11 reaches the target temperature of 500° C. or more, the temperature elevation action of the SOx trap catalyst 11 is stopped. If the temperature elevation action of the SOx trap catalyst 11 is stopped and the temperature of the SOx trap catalyst 11 falls, the NOx in the exhaust gas is trapped in the SOx trap catalyst 11, so as shown in FIG. 14, the concentration of the NOx in the exhaust gas flowing out from the SOx trap catalyst 11 becomes temporarily low.

Further, as explained above, if the SOx trap catalyst 11 deteriorates, the NOx storage amount decreases. Therefore, when the NOx storage amount in the SOx trap catalyst 11 becomes lower than a predetermined amount, it can be judged that the SOx trap catalyst 11 has deteriorated. However, direct detection of the NOx amount stored in the SOx trap catalyst 11 is difficult. Therefore, it is difficult to judge if the SOx trap catalyst 11 is deteriorating by directly detecting the NOx storage amount.

However, if the temperature elevation action of the SOx trap catalyst 11 is performed, the majority of the NOx stored in the SOx trap catalyst 11 is released. At this time, the concentration of the NOx in the exhaust gas passing through the SOx trap catalyst 11 changes due to the effect of the released NOx. At this time, the change in the NOx concentration corresponds to the released NOx amount, that is, the NOx storage amount. Therefore, in the present invention, the amount of NOx released from the SOx trap catalyst 11 is detected from the change in the concentration of the NOx in the exhaust gas while the exhaust gas passes through the SOx trap catalyst 11.

However, this change in NOx concentration is the difference of concentration between the concentration of NOx in the exhaust gas flowing into the SOx trap catalyst 11 and the concentration of the NOx in the exhaust gas flowing out from the SOx trap catalyst 11. Therefore, in the present invention, as explained above, the exhaust pipe 13 between the SOx trap catalyst 11 and the NOx storing catalyst 12 is provided with the NOx concentration sensor 24 for detecting the concentration of the NOx in the exhaust gas flowing out from the SOx trap catalyst 11. The difference of concentration between the concentration of NOx in the exhaust gas exhausted from the engine and flowing into the SOx trap catalyst 11 and the concentration of NOx in the exhaust gas detected by the NOx concentration sensor 24 is used to find the change in the NOx concentration.

Figure 15:
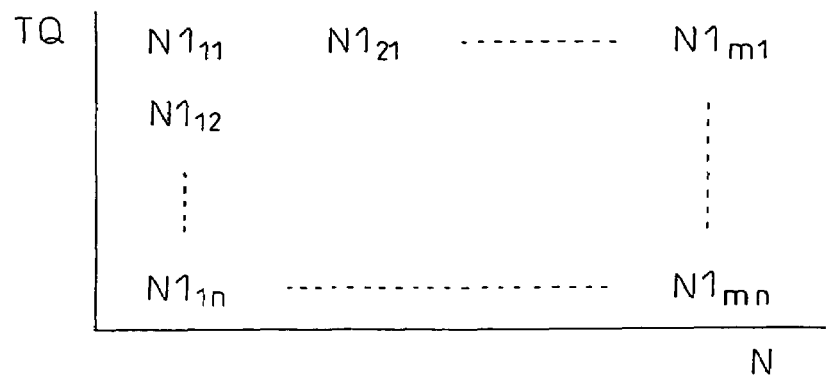
FIG. 15 is a view showing a map of the NOx concentration N1.

Here, the concentration of NOx in the exhaust gas flowing out from the engine and flowing into the SOx trap catalyst 11 is unambiguously determined in accordance with the operating state of the engine. Therefore, in an embodiment according to the present invention, the concentration N1 of NOx in the exhaust gas exhausted from the engine, as shown in FIG. 15, as stored as a function of the required torque TQ and engine rotational speed N in the form of a map in advance in the ROM 32.

Further, the NOx concentration shown in FIG. 14, as explained above, is the concentration of NOx in the exhaust gas flowing out from the SOx trap catalyst 11. This NOx concentration increases temporarily as shown by the solid line A if a temperature elevation control is performed. The majority of the increased amount of concentration of the NOx concentration shown by this solid line A expresses the difference of concentration of NOx before and after the SOx trap catalyst 11. The magnitude of this NOx concentration difference expresses the amount of NOx released from the SOx trap catalyst 11. Therefore, it is possible to judge whether the SOx trap catalyst 11 has deteriorated from the magnitude of this NOx concentration difference.

Note that as the magnitude of the NOx concentration difference representing the amount of NOx released from the SOx trap catalyst 11, various types of magnitudes may be considered. In an embodiment of the present invention, as the value representing the amount of NOx released from the SOx trap catalyst 11, the maximum value $\Delta N_{max}$ of the NOx concentration difference shown in FIG. 14 is used. When the maximum value $\Delta N_{max}$ of the NOx concentration difference becomes a predetermined value or less, it is judged that the SOx trap catalyst 11 has deteriorated. Further, in another embodiment of the present invention, as another value representing the amount of NOx released from the SOx trap catalyst 11, the cumulative value $\Sigma \Delta N$ of the NOx concentration difference shown by the hatching in FIG. 14 is used. When the cumulative value $\Sigma \Delta N$ of the NOx concentration difference becomes a predetermined value or less, it is judged that the SOx trap catalyst 11 has deteriorated.

Figure 16:
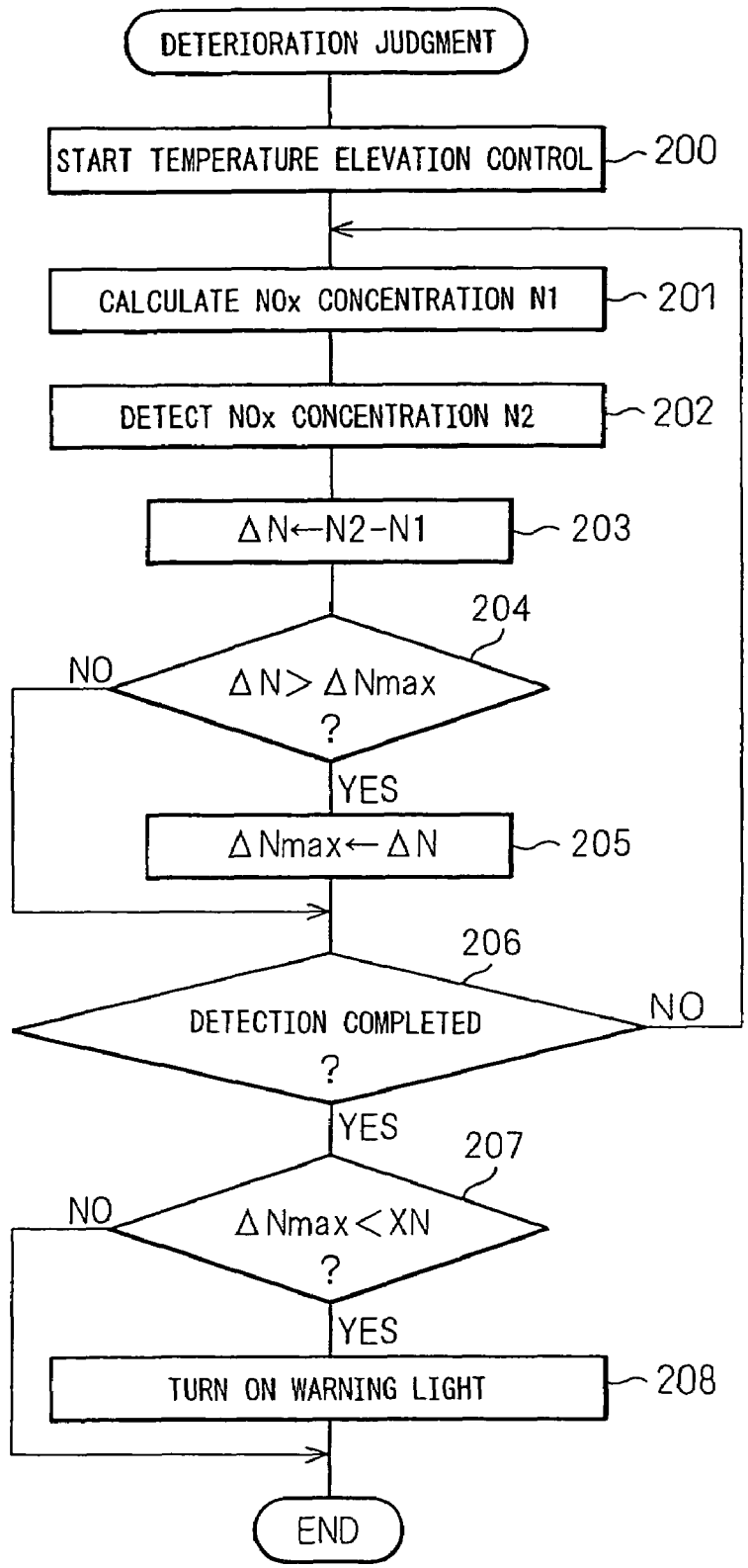
FIG. 16 is a flowchart for deterioration judgment.

FIG. 16 shows the deterioration judgment routine in the case of using the maximum value $\Sigma N_{max}$ of the NOx concentration difference as a value representing the amount of NOx released from the SOx trap catalyst 11. This judgment routine is executed for example every time the vehicle running distance exceeds 1000 km. Therefore, the frequency by which this deterioration judgment routine is performed is much higher than the frequency of the SOx stabilization temperature elevation control for restoration of the SOx trap rate as shown in FIG. 10.

Referring to FIG. 16, first, at step 200, the temperature of the SOx trap catalyst 11 is temporarily raised to 500° C. or more under a lean air-fuel ratio of the exhaust gas in the temperature elevation control for deterioration judgment. Next, at step 201, the concentration N1 of NOx in the exhaust gas flowing into the SOx trap catalyst 11 is calculated from the map shown in FIG. 15. Next, at step 202, the NOx concentration sensor 24 is used to detect the concentration N2 of the NOx in the exhaust gas flowing out from the SOx trap catalyst 11. Next, at step 203, the NOx concentration N1 is subtracted from the NOx concentration N2 to calculate the NOx concentration difference $\Delta N$.

Next, at step 204, it is judged if the NOx concentration difference $\Delta N$ is larger than the maximum value $\Delta N_{max}$. When $\Delta N \leq \Delta N_{max}$, the routine jumps to step 206, while when $\Delta N > \Delta N_{max}$, the routine proceeds to step 205 where $\Delta N$ is made $\Delta N_{max}$, then the routine proceeds to step 206. That is, at steps 204 and 205, the maximum value $\Delta N_{max}$ of the NOx concentration difference $\Delta N$ is found.

Next, at step 206, it is judged if the detection has ended. For example, when the NOx concentration difference $\Delta N$ rises, then becomes substantially zero, it is judged that the detection has ended. When the detection has not ended, the routine returns to step 201. As opposed to this, when the detection ends, the routine proceeds to step 207, where it is judged if the maximum value $\Delta N_{max}$ of the NOx concentration difference is a predetermined value XN or less. When $\Delta N_{max} < XN$, it is judged that the SOx trap catalyst 11 has deteriorated and the routine proceeds to step 208, where a warning lamp showing that the SOx trap catalyst 11 has deteriorated is turned on.

Figure 17:
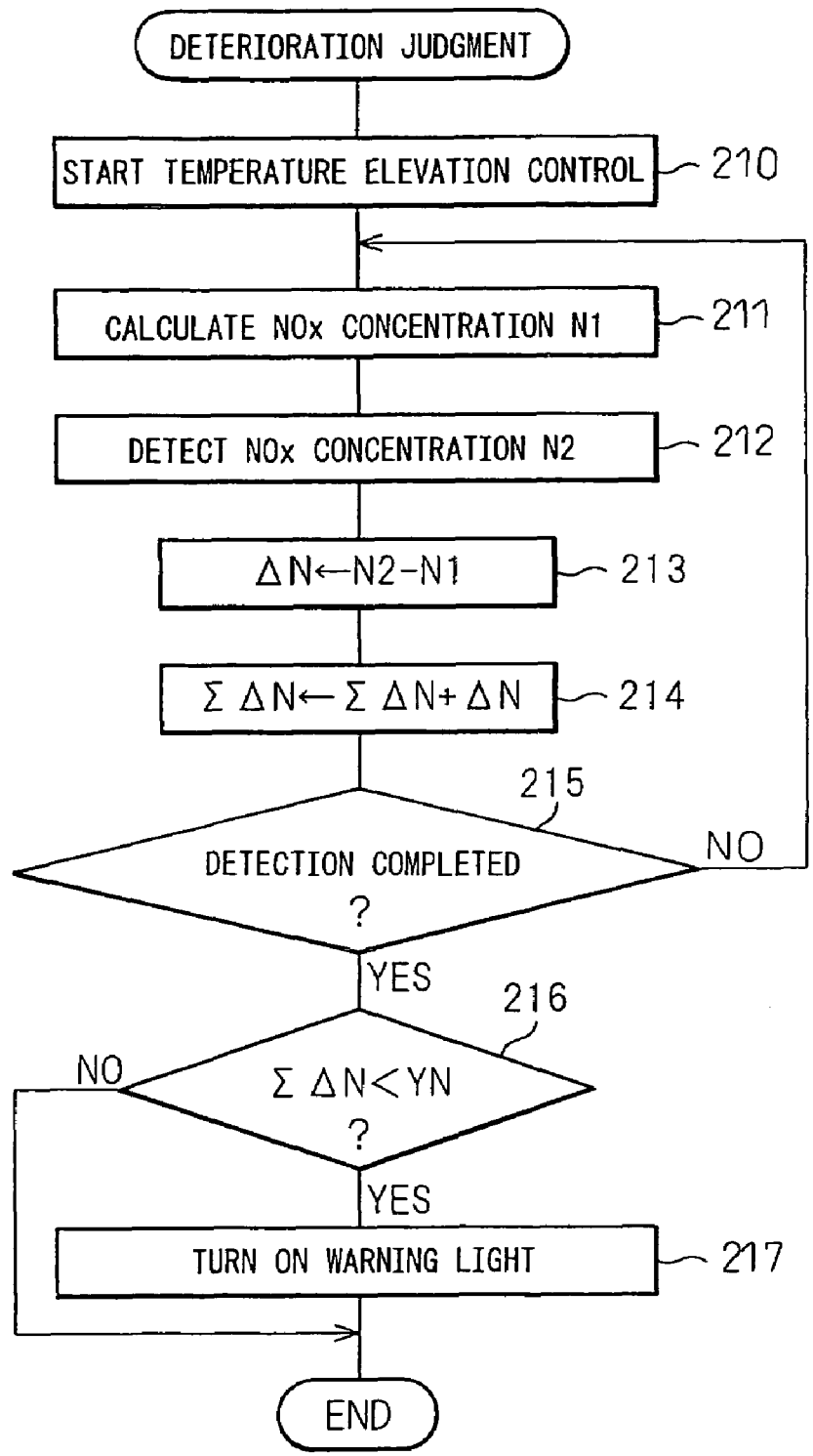
FIG. 17 is a flowchart of another embodiment for deterioration judgment.

FIG. 17 shows a deterioration judgment routine of the case of using the cumulative value $\Sigma \Delta N$ of the NOx concentration difference as a value representing the amount of NOx released from the SOx trap catalyst 11. The frequency by which this judgment routine is performed is also far higher than the frequency of the temperature elevation control for SOx stabilization performed for restoring the SOx trap rate in the same way as the example shown in FIG. 17.

Referring to FIG. 17, first, at step 210, the temperature of the SOx trap catalyst 11 is temporarily raised to about 500° C. or more under a lean air-fuel ratio of the exhaust gas in the temperature elevation control for deterioration judgment. Next, at step 211, the concentration N1 of the NOx in the exhaust gas flowing into the SOx trap catalyst 11 is calculated from the map shown in FIG. 15. Next, at step 212, the concentration N2 of the NOx in the exhaust gas flowing out from the SOx trap catalyst 11 is detected by the NOx concentration sensor 24. Next, at step 213, the NOx concentration N1 is subtracted from the NOx concentration N2 to calculate the NOx concentration difference $\Delta N$.

Next, at step 214, the NOx concentration difference $\Delta N$ is added to $\Sigma \Delta N$ to calculate the cumulative value $\Sigma \Delta N$ of the NOx concentration difference. Next, at step 215, whether the detection has ended or not is judged. When the detection has not ended, the routine returns to step 211. As opposed to this, when the detection ends, the routine proceeds to step 216, where whether the cumulative value $\Sigma \Delta N$ of the NOx concentration difference is the predetermined value YN or less is judged. When $\Sigma \Delta N < YN$, the SOx trap catalyst 11 is judged to have deteriorated, then the routine proceeds to step 217, where a warning light showing that the SOx trap catalyst 11 has deteriorated is turned on.

Figure 18:
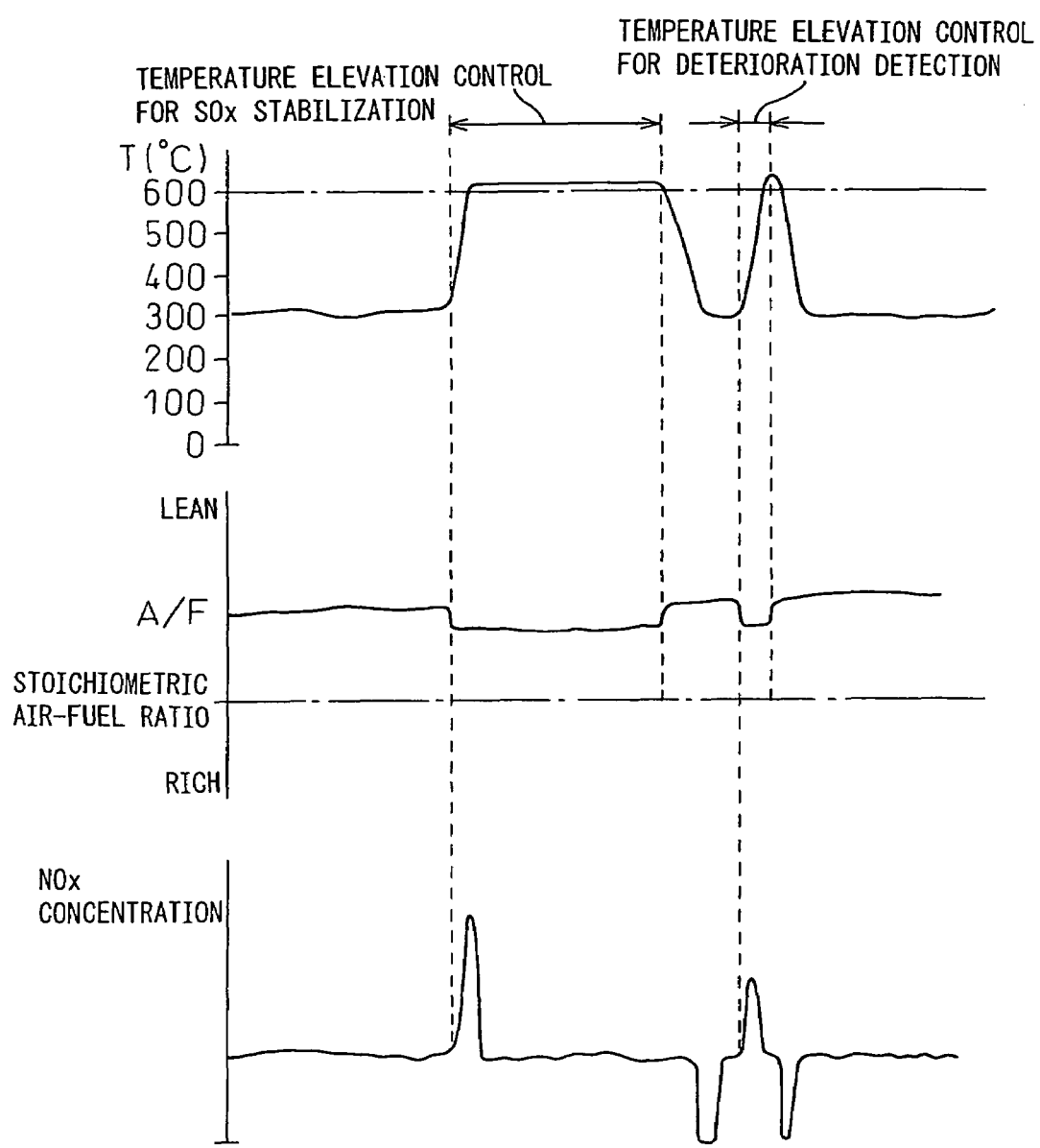
FIG. 18 is a time chart for explaining a temperature elevation control for SOx stabilization and the deterioration judgment method.

FIG. 18 shows another embodiment. In this embodiment, right after the control for restoration of the SOx trap rate, the deterioration of the SOx trap catalyst 11 is judged. That is, in this embodiment, as shown in FIG. 18, to restore the SOx trap rate, the temperature elevation control for maintaining the temperature of the SOx trap catalyst 11 for a predetermined period at a predetermined temperature or more for SOx stabilization is periodically performed. Right after the completion of the temperature elevation control for this SOx stabilization, the temperature elevation control for deterioration detection of the SOx trap catalyst 11 is performed and whether the SOx trap catalyst 11 has deteriorated is judged.

That is, even if the SOx trap rate falls, when the temperature elevation control for SOx stabilization is performed, if the SOx trap rate recovers, the SOx trap catalyst 11 can still be sufficiently used. However, when the temperature elevation control is performed for SOx stabilization, if the SOx trap rate is not restored at all, SOx trap catalyst 11 deteriorates and this SOx trap catalyst 11 will no longer be able to withstand use.

To judge whether the SOx trap catalyst 11 can no longer withstand use in this way, as shown in FIG. 18, it is necessary to perform the temperature elevation control for SOx stabilization before the temperature elevation control for deterioration detection. Note that, this temperature elevation control for SOx stabilization is performed at a far higher frequency than the temperature elevation control for SOx stabilization shown in FIG. 10.

Figure 19:
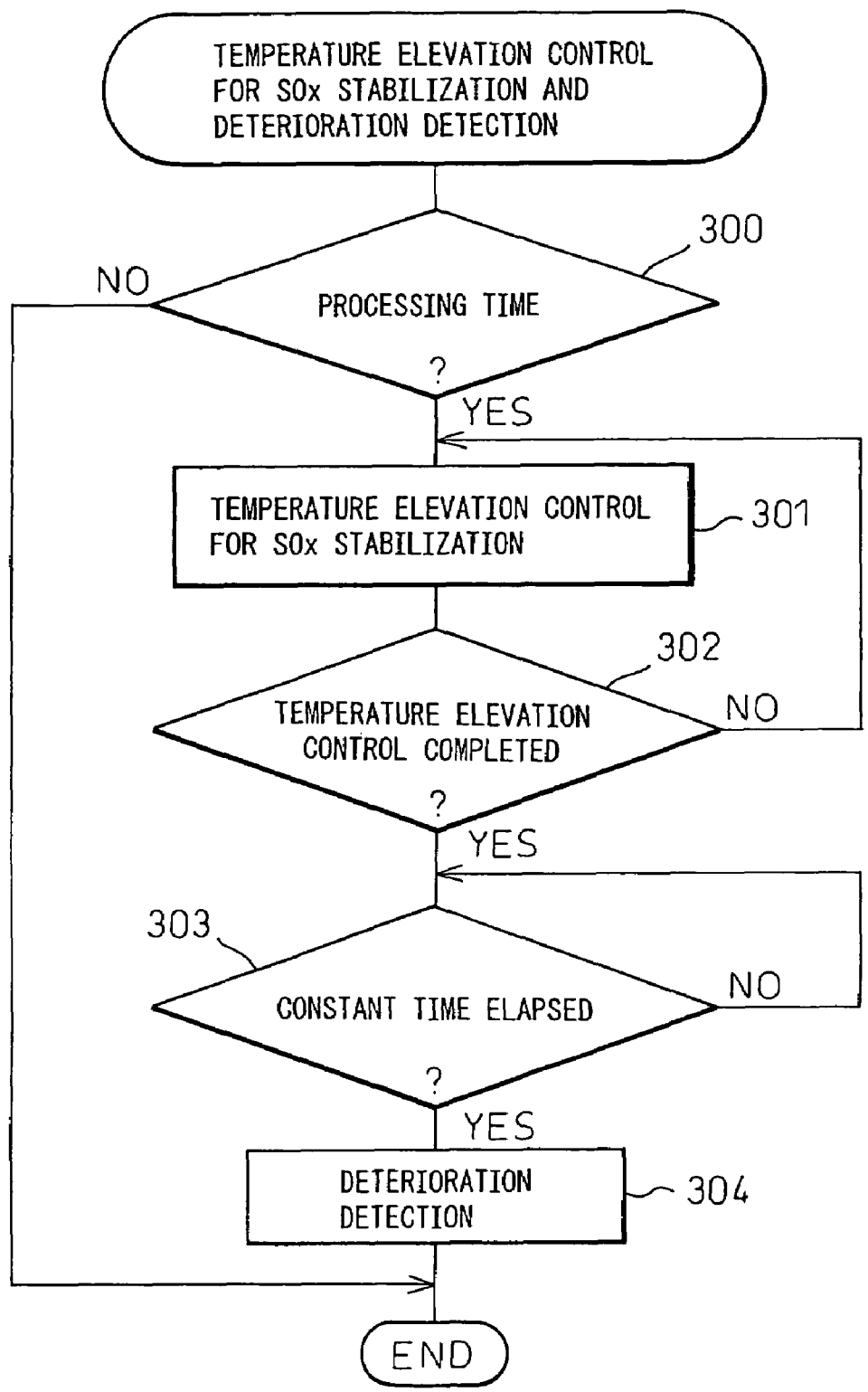
FIG. 19 is a flowchart for a temperature elevation control for SOx stabilization and deterioration detection.

FIG. 19 shows the temperature elevation control routine for SOx stabilization and deterioration detection shown in FIG. 18.

Referring to FIG. 19, first, at step 300, it is judged if it is the timing for SOx stabilization and deterioration detection. When it is the timing for SOx stabilization and deterioration detection, the routine proceeds to step 301, where the temperature elevation control for SOx stabilization is performed. Next, at step 302, whether the temperature elevation control for SOx stabilization has been completed is judged. When not completed, the routine returns to step 301, where the temperature elevation control for SOx stabilization is continued.

As opposed to this, when the temperature elevation control for the SOx stabilization has ended, the routine proceeds to step 303, where whether a certain time has elapsed is judged. When the certain time has elapsed, the routine proceeds to step 304, where a temperature elevation control for deterioration detection and judgment of deterioration of the SOx trap catalyst 11 are performed.

Next, referring to FIG. 20 to FIG. 24, an explanation will be given of an embodiment judging whether the SOx trap catalyst 11 has deteriorated when raising the temperature of the particulate filter. In explaining this embodiment, first, the processing on the NOx storing catalyst 12 will be explained.

Figure 20:
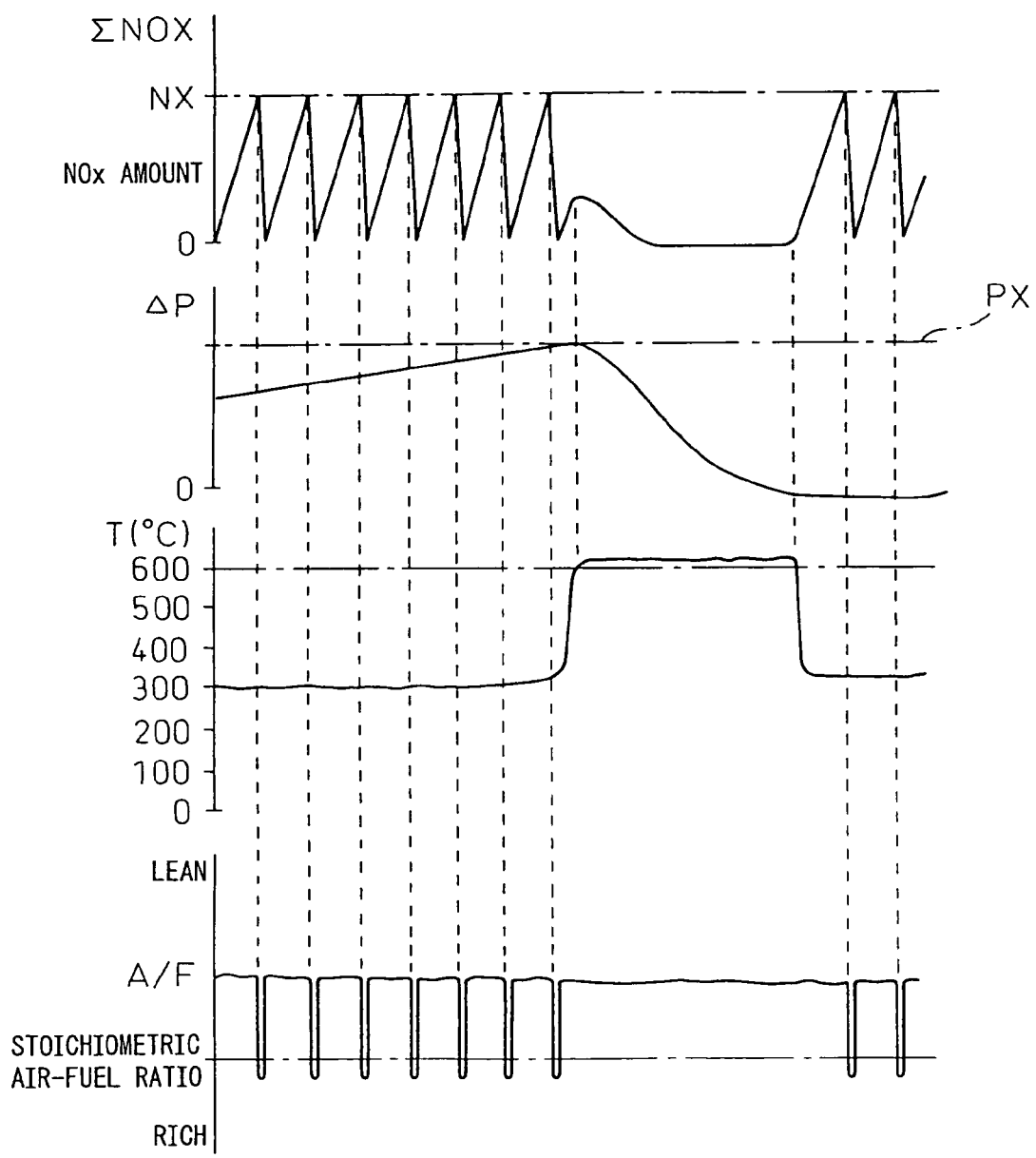
FIG. 20 is a time chart showing a temperature elevation control of the particulate filter.

In an embodiment according to the present invention, the NOx amount NOXA stored in the NOx storing catalyst 12 per unit time is stored in advance in the ROM 32 as a function of the required torque TQ and engine rotational speed N in the form of the map shown in FIG. 22(A). By cumulatively adding this NOx amount NOXA, the NOx amount $\Sigma$NOX stored in the NOx storing catalyst 12 is calculated. Further, in an embodiment according to the present invention, as shown in FIG. 20, each time this NOx amount $\Sigma$NOX reaches the allowable value NX, the air-fuel ratio of the exhaust gas flowing into the NOx storing catalyst 12 A/F is temporarily made rich. Due to this, the NOx storing catalyst 12 releases NOx.

Note that, when making the air-fuel ratio of the exhaust gas flowing into the NOx storing catalyst 12 A/F rich, the air-fuel ratio of the exhaust gas flowing into SOx trap catalyst 11 has to be maintained lean. Therefore, in an embodiment according to the present invention, a reducing agent feed device, for example, as shown in FIG. 1 and FIG. 2, the reducing agent feed valve 14, is arranged in the exhaust passage between the SOx trap catalyst 11 and the NOx storing catalyst 12. When the NOx storing catalyst 12 should release the NOx, this reducing agent feed valve 14 feeds reducing agent into the exhaust passage to make the air-fuel ratio of the exhaust gas flowing into the NOx storing catalyst 12 temporarily rich.

On the other hand, the particulate matter contained in the exhaust gas is trapped on the particulate filter 12*a* carrying the NOx storing catalyst 12 and successively oxidized. However, if the amount of trapped particulate matter becomes greater than the amount of the oxidized particulate matter, the particulate matter will gradually build up on the particulate filter 12*a*. In this case, if the amount of deposition of the particulate matter increases, it will end up inducing a drop in the engine output. Therefore, when the amount of deposition of the particulate matter increases, the deposited particulate matter must be removed. In this case, if the temperature of the particulate filter 12a is raised to about 600° C. under an excess of air, the deposited particulate matter will be oxidized and removed.

Therefore, in an embodiment according to the present invention, when the amount of the particulate matter deposited on the particulate filter 12a exceeds an allowable amount, the temperature of the particulate filter 12a is raised under a lean air-fuel ratio of the exhaust gas whereby the deposited particulate matter is removed by oxidation. Specifically, in an embodiment according to the present invention, when the pressure difference ΔP before and after the particulate filter 12a detected by the pressure difference sensor 23 exceeds the allowable value PX as shown in FIG. 20, it is judged that the amount of the deposited particulate matter has exceeded the allowable amount. At this time, a temperature elevation control for maintaining the air-fuel ratio of the exhaust gas flowing into the particulate filter 12a lean and raising the temperature T of the particulate filter 12a is performed. When this temperature elevation control is performed, deterioration of the SOx trap catalyst 11 is judged. Note that when the temperature T of the particulate filter 12a rises, the NOx storing catalyst 12 releases the NOx, so the trapped NOx amount ΣNOX is reduced.

In this way, in this embodiment, when the particulate filter 12a should be raised in temperature, the deterioration of the SOx trap catalyst 11 is judged, so at this time the SOx trap catalyst 11 also has to be raised in temperature. Therefore, in this embodiment, when the particulate filter 12a should be raised in temperature, one of the injection control shown from (II) to (IV) of FIG. 8 is performed or the hydrocarbon feed valve 25 feeds a hydrocarbon to raise the SOx trap catalyst 11 and particulate filter 12a in temperature under a lean air-fuel ratio of the exhaust gas.

On the other hand, after the SOx trap catalyst 11 finishes releasing NOx, the temperature of the SOx trap catalyst 11 does not have to be held at a high temperature. It is sufficient to hold only the temperature of the particulate filter 12a at a high temperature. Therefore, after the SOx trap catalyst 11 finishes releasing NOx, the temperature elevation action of the SOx trap catalyst 11 is stopped. The reducing agent feed valve 14 feeds the reducing agent in the range where the air-fuel ratio of the exhaust gas can be kept lean. The heat of the oxidation reaction of this reducing agent may be used to hold the temperature of the particulate filter 12a at a high temperature.

On the other hand, when the SOx trap rate by the SOx trap catalyst 11 is 100 percent, SOx does not flow into the NOx storing catalyst 12 at all. Therefore, in this case, there is no risk at all of the NOx storing catalyst 12 storing SOx. As opposed to this, when the SOx trap rate is not 100 percent, even if the SOx trap rate is close to 100 percent, SOx is stored in the NOx storing catalyst 12. However, in this case, the SOx amount stored in the NOx storing catalyst 12 per unit time is extremely small. This being so, if a long time elapses, a large amount of SOx is stored in the NOx storing catalyst 12. If a large amount of SOx is stored, the stored SOx has to be released.

Figure 21:
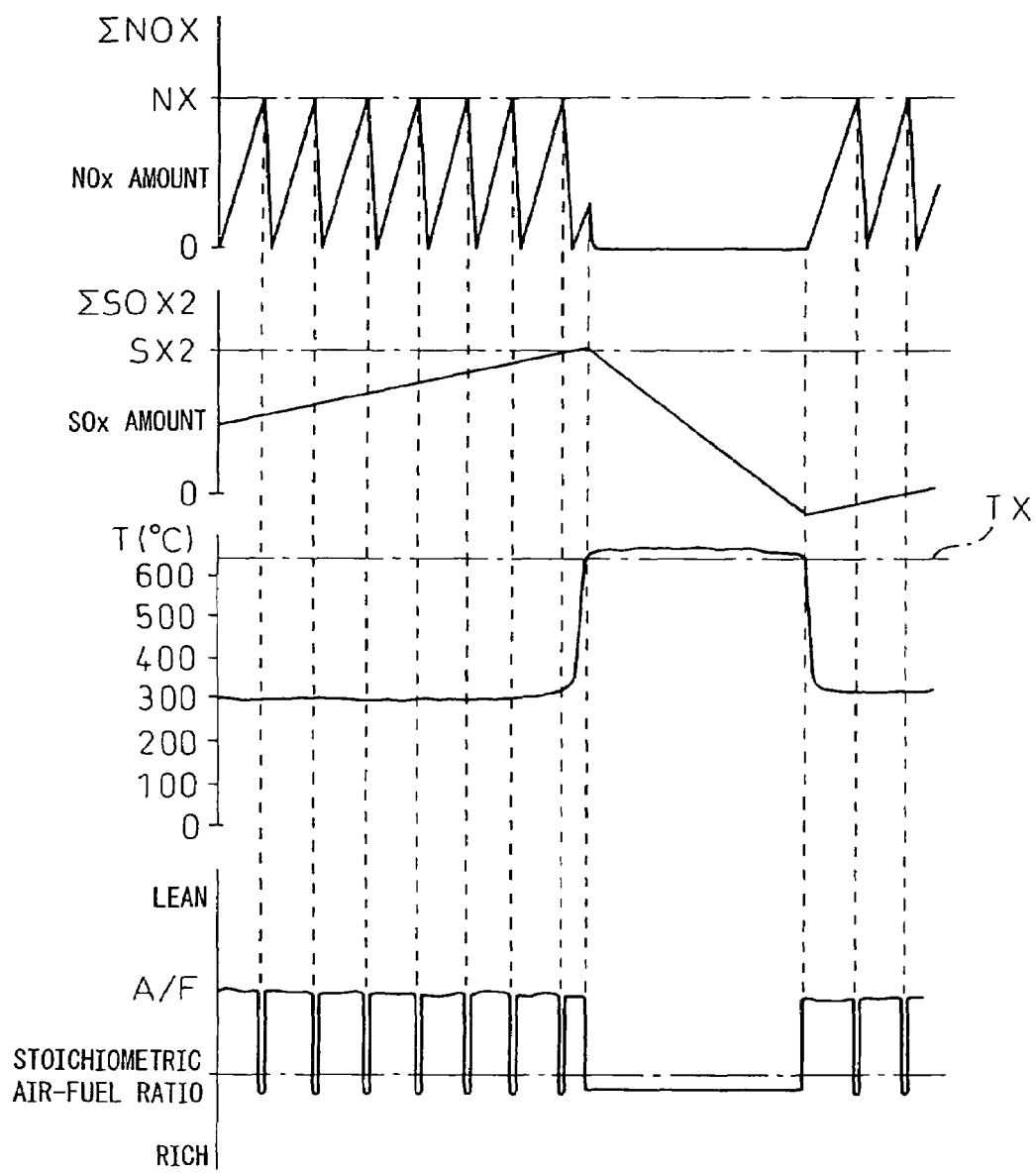
FIG. 21 is a time chart showing an SOx release control.

As explained above, to make the NOx storing catalyst 12 release SOx, the temperature of the NOx storing catalyst 12 has to be raised to the SOx release temperature and the air-fuel ratio of the exhaust gas flowing into the NOx storing catalyst 12 has to be made rich. Therefore, in an embodiment according to the present invention, as shown in FIG. 21, when the SOx amount ΣSOX2 stored in the NOx storing catalyst 12 reaches the allowable value SX2, the temperature T of the NOx storing catalyst 12 is raised to the SOx release temperature TX and the air-fuel ratio of the exhaust gas flowing into the NOx storing catalyst 12 is made rich. Note that, the SOx amount SOXZ stored in the NOx storing catalyst 12 per unit time is stored as a function of the required torque TQ and engine rotational speed N in the form of the map shown in FIG. 22(B) in advance in the ROM 32. By cumulatively adding the SOx amount SOXZ, the stored SOx amount ΣSOX2 is calculated.

When the NOx storing catalyst 12 releases SOx, if the air-fuel ratio of the exhaust gas flowing into SOx trap catalyst 11 is made rich, the SOx trapped in the SOx trap catalyst 11 is released from the SOx trap catalyst 11, and the released SOx ends up being stored in the NOx storing catalyst 12. Therefore, when the NOx storing catalyst 12 releases SOx, the air-fuel ratio of the exhaust gas flowing into SOx trap catalyst 11 cannot be made rich. Therefore, in an embodiment according to the present invention, when the NOx storing catalyst 12 should release SOx, first, the air-fuel ratio of the exhaust gas flowing into the SOx trap catalyst 11 and NOx storing catalyst 12 is maintained lean and the reducing agent feed valve 14 feeds the reducing agent to raise the temperature T of the NOx storing catalyst 12 to the SOx release temperature TX, then the air-fuel ratio of the exhaust gas flowing into SOx trap catalyst 11 is maintained lean and the amount of feed of the reducing agent from the reducing agent feed valve 14 is increased to make the air-fuel ratio of the exhaust gas flowing into the NOx storing catalyst 12 rich. Note that, in this case, it is also possible to alternately switch the air-fuel ratio of the exhaust gas flowing into the NOx storing catalyst 12 between rich and lean.

Figure 23:
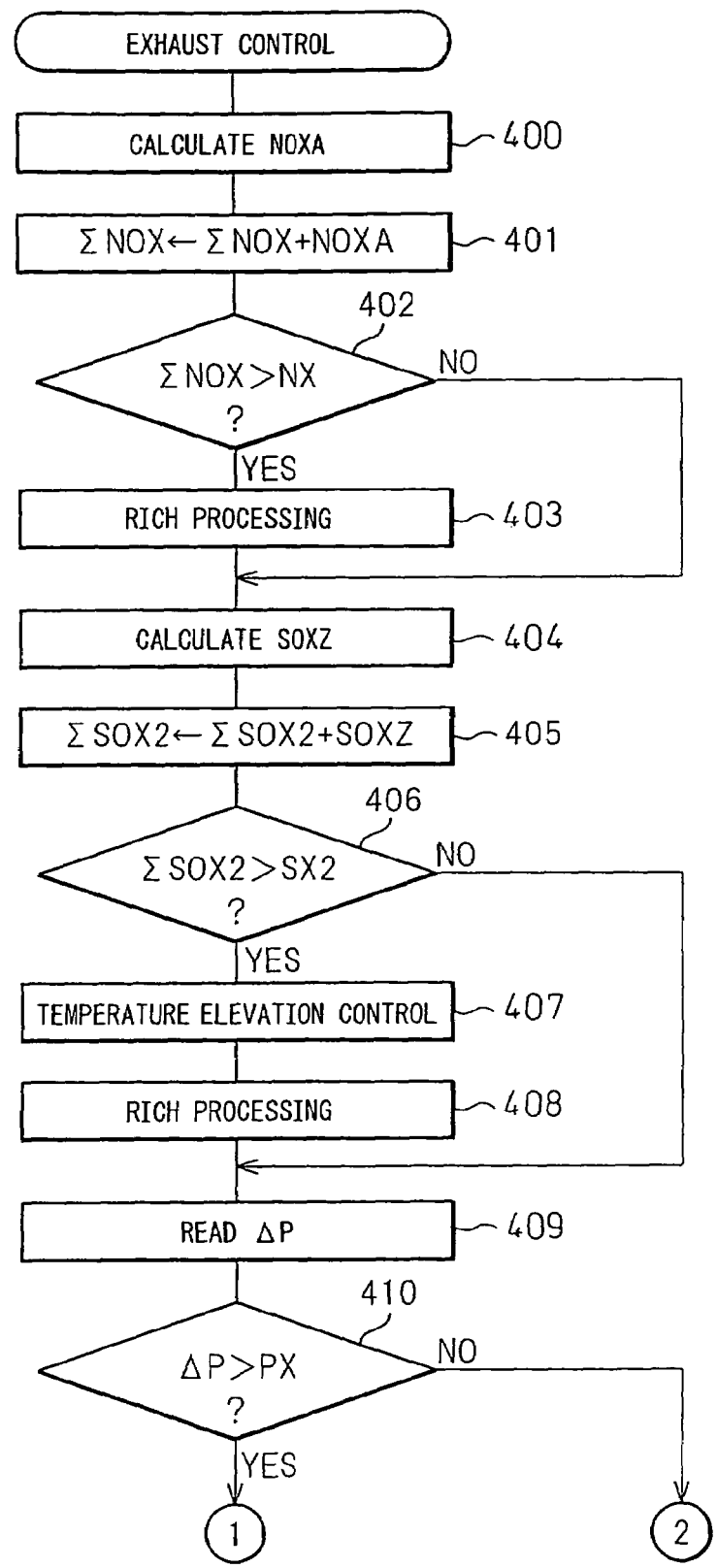
FIG. 23 and FIG. 24 are flow charts for executing an exhaust control.
Figure 24:
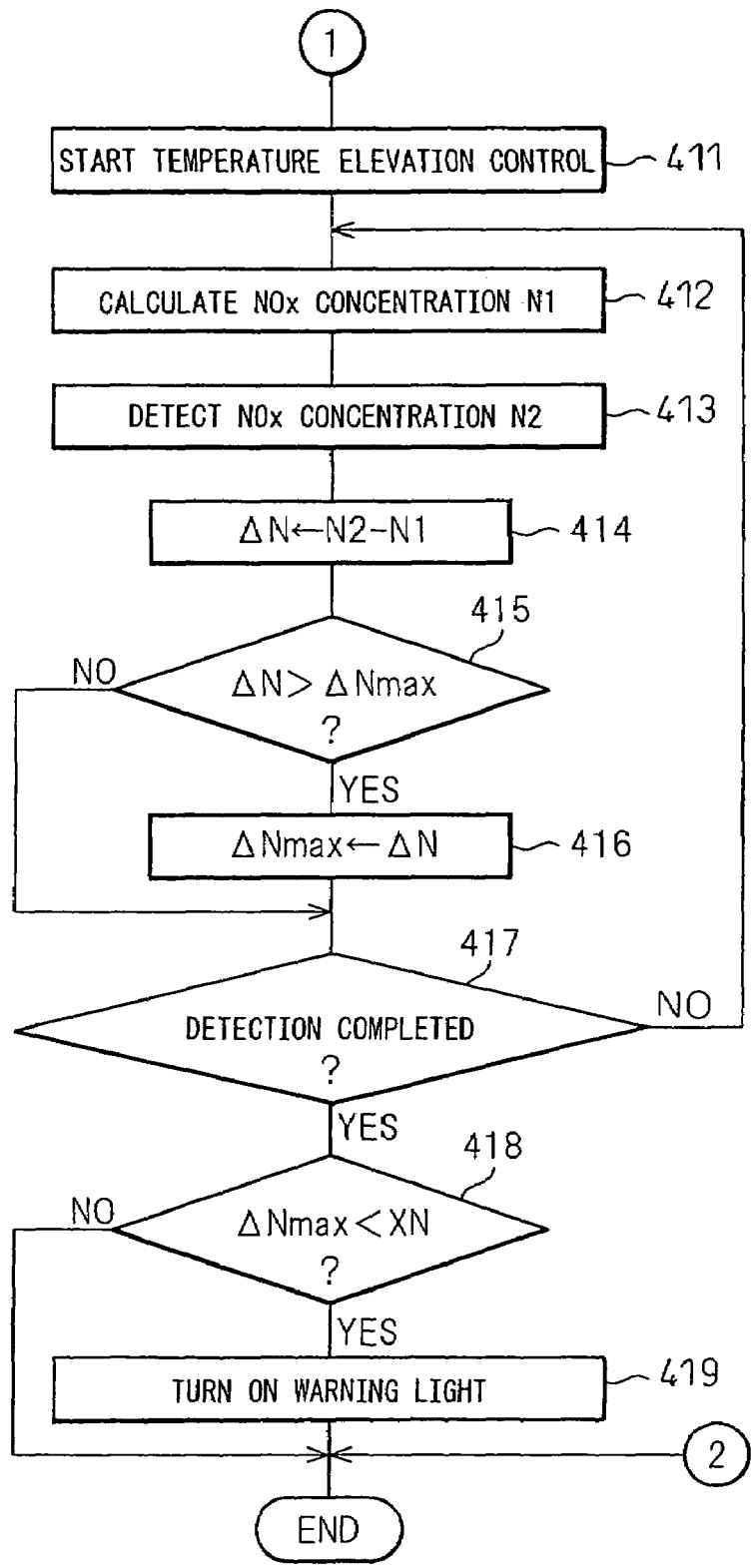

FIG. 23 and FIG. 24 show an exhaust control routine for working this embodiment.

Referring to FIG. 23 and FIG. 24, first, at step 400, the NOx amount NOXA stored per unit time is calculated from the map shown in FIG. 22(A). Next, at step 401, this NOXA is added to the NOx amount ΣNOX stored in the NOx storing catalyst 12. Next, at step 402, it is judged whether the stored NOx amount ΣNOX exceeded the allowable value NX. When ΣNOX>NX, the routine proceeds to step 403, where the rich processing for temporarily switching the air-fuel ratio of the exhaust gas flowing into the NOx storing catalyst 12 from lean to rich by the reducing agent fed from the reducing agent feed valve 14 is performed and ΣNOX is cleared.

Next, at step 404, the SOx amount SOXZ stored per unit time is calculated from the map shown in FIG. 22(B). Next, at step 405, this SOXZ is added to the SOx amount ΣSOX2 stored in the NOx storing catalyst 12. Next, at step 406, it is judged if the stored SOx amount ΣSOX2 has exceeded the allowable value SX2. When ΣSOX2>SX2, the routine proceeds to step 403, where the temperature elevation control for maintaining the air-fuel ratio of the exhaust gas flowing into the NOx storing catalyst 12 lean and feeding the reducing agent feed valve 14 reducing agent to raise the temperature T of the NOx storing catalyst 12 to the SOx release temperature TX is performed. Next, at step 408, the rich processing for maintaining the air-fuel ratio of the exhaust gas flowing into the NOx storing catalyst 12 rich by the reducing agent fed from the reducing agent feed valve 14 is performed, and ΣSOX2 is cleared.

Next, at step 409, the pressure difference sensor 23 detects the pressure difference ΔP before and after the particulate filter 12a. Next, at step 418, it is judged whether the pressure difference ΔP has exceeded the allowable value PX. When ΔP>PX, the routine proceeds to step 411, where the temperature elevation control of the SOx trap catalyst 11 and the particulate filter 12a is started. Next, from step 412 to step 419, the same method as with step 201 to step 208 of the deterioration judgment routine shown in FIG. 16 is used to judge if the SOx trap catalyst 11 has deteriorated.

That is, at step 412, the concentration N1 of the NOx in the exhaust gas flowing into the SOx trap catalyst 11 is calculated from the map shown in FIG. 15. Next, at step 413, the concentration N2 of the NOx in the exhaust gas flowing out from the SOx trap catalyst 11 is detected by the NOx concentration sensor 24. Next, at step 414, the NOx concentration N1 is subtracted from the NOx concentration N2 to calculate the NOx concentration difference $\Delta N$. Next, at steps 415 and 416, the maximum value $\Delta N_{max}$ of the NOx concentration difference $\Delta N$ is found.

Next, at step 417, it is judged if the detection has ended. When it is judged that detection has ended, the routine proceeds to step 418, where it is judged if the maximum value $\Delta N_{max}$ of the NOx concentration difference is a predetermined value XN or less. When $\Delta N_{max}<XN$, it is judged that the SOx trap catalyst 11 has deteriorated and the routine proceeds to step 419, where a warning lamp showing that the SOx trap catalyst 11 has deteriorated is turned on.

According to the present invention, it is possible to suppress the action of release of SOx from the SOx trap catalyst while maintaining a high NOx storage ability of the NOx storing catalyst and further possible to judge if the SOx trap catalyst has deteriorated.

The invention claimed is:

1. An exhaust purification apparatus for an exhaust passage of a compression ignition type internal combustion engine, the exhaust purification apparatus comprising:
   an SOx trap catalyst that traps SOx contained in exhaust gas, NOx storing catalyst in the exhaust passage downstream of the SOx trap catalyst, the NOx storing catalyst storing NOx contained in the exhaust gas when an air-fuel ratio of inflowing exhaust gas is lean and releasing the stored NOx when the air-fuel ratio of the exhaust gas a stoichiometric air-fuel ratio or rich, wherein the SOx trap catalyst:
   traps the SOx contained in the exhaust gas when the air-fuel ratio of the exhaust gas flowing into the SOx trap catalyst is lean,
   allows the trapped SOx to gradually diffuse inside the SOx trap catalyst when the air-fuel ratio of the exhaust gas is lean and the SOx trap catalyst rises in temperature,
   releases the trapped SOx when the air-fuel ratio of the exhaust gas flowing into the SOx trap catalyst becomes rich and the temperature of the SOx trap catalyst is at least the SOx release temperature;
   air-fuel ratio controlling means for controlling the air-fuel ratio of the exhaust gas flowing into the SOx trap catalyst to be lean without making the air-fuel ratio rich during an engine operation; and
   deterioration judging means for judging if the SOx trap catalyst has deteriorated, wherein
   the temperature of the SOx trap catalyst is raised in a state where the air-fuel ratio of the exhaust gas is lean and the NOx amount released from the SOx trap catalyst is detected, and the deterioration judging means judges if the SOx trap catalyst has deteriorated based on the detected amount of NOx released from the SOx trap catalyst.

2. An exhaust purification apparatus as set forth in claim 1, wherein the NOx amount released from said SOx trap catalyst is detected from a change in the concentration of NOx in the exhaust gas while the exhaust gas is passing through the SOx trap catalyst.

3. An exhaust purification apparatus as set forth in claim 2, wherein an NOx concentration sensor for detecting the concentration of the NOx in the exhaust gas flowing out from the SOx trap catalyst is disposed in the engine exhaust passage between the SOx trap catalyst and the NOx storing catalyst, and the change in said NOx concentration is determined from the difference in concentration between the concentration of the NOx in the exhaust gas exhausted from the engine and flowing into the SOx trap catalyst and the concentration of the NOx in the exhaust gas detected by the NOx concentration sensor.

4. An exhaust purification apparatus as set forth in claim 3, wherein the concentration of the NOx in the exhaust gas exhausted from the engine is stored in advance.

5. An exhaust purification apparatus as set forth in claim 3, wherein the maximum value of said difference of concentration is used as a value representing the NOx amount released from said SOx trap catalyst and it is judged that the SOx trap catalyst has deteriorated when the maximum value of the difference of concentration becomes a predetermined value or less.

6. An exhaust purification apparatus as set forth in claim 3, wherein the cumulative value of said difference of concentration is used as a value representing the NOx amount released from said SOx trap catalyst and it is judged that the SOx trap catalyst has deteriorated when the cumulative value of the difference of concentration becomes a predetermined value or less.

7. An exhaust purification apparatus as set forth in claim 1, wherein when whether SOx trap catalyst has deteriorated should be judged, the temperature of the SOx trap catalyst is temporarily raised to about 500° C. or more under a lean air-fuel ratio of the exhaust gas.

8. An exhaust purification apparatus as set forth in claim 1, wherein to restore the SOx trap rate, a temperature elevation control for maintaining the temperature of the SOx trap catalyst for a predetermined period at a predetermined temperature or more is periodically performed and after the temperature elevation control has been completed, the temperature of the SOx trap catalyst is again raised and whether the SOx trap catalyst has deteriorated is judged.

9. An exhaust purification apparatus as set forth in claim 1, further comprising:
   estimating means for estimating the SOx amount trapped by the SOx trap catalyst; and
   a temperature elevation control for deterioration judgment for raising the temperature of the SOx trap catalyst under a lean air-fuel ratio of the exhaust gas, wherein
   temperature elevation control performs SOx stabilization by raising the temperature of the SOx trap catalyst under a lean air-fuel ratio of the exhaust gas for restoring the SOx trap rate when the SOx amount trapped by the SOx trap catalyst exceeds a predetermined amount, and the frequency of the temperature elevation control for deterioration judgment is higher than the frequency of said temperature elevation control for SOx stabilization.

10. An exhaust purification apparatus as set forth in claim 9, wherein said predetermined amount is increased based on the temperature elevation control for SOx stabilization performed for restoring the SOx trap rate and the rate of increase of the predetermined amount is reduced based on the number of times of the temperature elevation control for SOx stabilization is performed.

11. An exhaust purification apparatus as set forth in claim 1, wherein the NOx storing catalyst is carried on a particulate filter for trapping and oxidizing the particulate matter included in the exhaust gas, the temperature of the particulate filter is raised under a lean air-fuel ratio of the exhaust gas when the amount of particulate matter deposited on the filter exceeds a predetermined amount, and whether the SOx trap catalyst has deteriorated is judged when the temperature of the particulate has been raised.

12. An exhaust purification apparatus as set forth in claim 1, wherein a reducing agent feeding device is provided in the exhaust passage between the SOx trap catalyst and NOx storing catalyst and, when the NOx storing catalyst should release NOx, the reducing agent feeding device feeds the reducing agent into the exhaust passage to temporarily make the air-fuel ratio of the exhaust gas flowing into the NOx storing catalyst rich.

13. An exhaust purification apparatus as set forth in claim 12, wherein the NOx storing catalyst stores SOx, the temperature of the NOx storing catalyst is raised to the SOx release temperature, and the reducing agent feed device feeds reducing agent into the exhaust passage to make the air-fuel ratio of the exhaust gas flowing into the NOx storing catalyst rich.

14. An exhaust purification apparatus as set forth in claim 1, wherein said SOx trap catalyst is comprised of a coat layer formed on a catalyst carrier and a precious metal catalyst carried on the coat layer and the coat layer includes an alkali metal, alkali earth metal, or rare earth metal dispersed in the coat layer.

\* \* \* \* \*